(12) United States Patent
Hayashi

(10) Patent No.: US 8,270,728 B2
(45) Date of Patent: Sep. 18, 2012

(54) INFORMATION PROCESSING APPARATUS AND INFORMATION PROCESSING METHOD

(75) Inventor: Junichi Hayashi, Kamakura (JP)

(73) Assignee: Canon Kabushiki Kaisha, Tokyo (JP)

( * ) Notice: Subject to any disclaimer, the term of this patent is extended or adjusted under 35 U.S.C. 154(b) by 667 days.

(21) Appl. No.: 12/487,517

(22) Filed: Jun. 18, 2009

(65) Prior Publication Data

US 2009/0324099 A1 Dec. 31, 2009

(30) Foreign Application Priority Data

Jun. 27, 2008 (JP) ................................. 2008-169334
May 20, 2009 (JP) ................................. 2009-122218

(51) Int. Cl.
*G06K 9/62* (2006.01)
(52) U.S. Cl. ...................................................... 382/209
(58) Field of Classification Search .................... 382/209
See application file for complete search history.

(56) References Cited

U.S. PATENT DOCUMENTS

| 5,499,294 A | 3/1996 | Friedman |
| 2002/0191090 A1 | 12/2002 | Safai |
| 2003/0126443 A1* | 7/2003 | Wakao ............................ 713/176 |
| 2004/0215960 A1 | 10/2004 | Wakao et al. |
| 2004/0227824 A1 | 11/2004 | Takahashi |
| 2006/0125935 A1 | 6/2006 | Torvinen |
| 2006/0152609 A1 | 7/2006 | Prentice et al. |

FOREIGN PATENT DOCUMENTS

CN 1765126 A 4/2006

OTHER PUBLICATIONS

Popescu AC (2005) Statistical tools for digital image forensics. Ph.D. Thesis, Department of Computer Science, Dartmouth College, Hanover, NH.*
Farid H et al: "Exposing Digital Forgeries in Color Filter Array Interpolated Images" IEEE Transactions on Signal Processing, IEEE Service Center, New York, NY, US, vol. 53, No. 10, Oct. 1, 2005, pp. 3948-3959.

* cited by examiner

*Primary Examiner* — Jingge Wu
*Assistant Examiner* — Nirav G Patel
(74) *Attorney, Agent, or Firm* — Canon USA Inc. IP Division

(57) ABSTRACT

An information processing apparatus inputs image data including a first pixel group, a second pixel group generated by interpolating the first pixel group and verification data of the first pixel group, verifies whether the first pixel group has been altered using the first pixel group and the verification data, verifies whether the second pixel group has been altered by determining whether the second pixel group and the first pixel group are in a predetermined relationship, and determines whether the image data has been altered based on results of the verification as to whether the first pixel group has been altered and the verification as to whether the second pixel group has been altered.

7 Claims, 19 Drawing Sheets

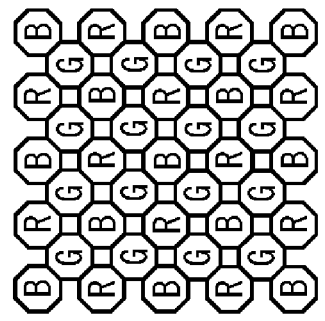

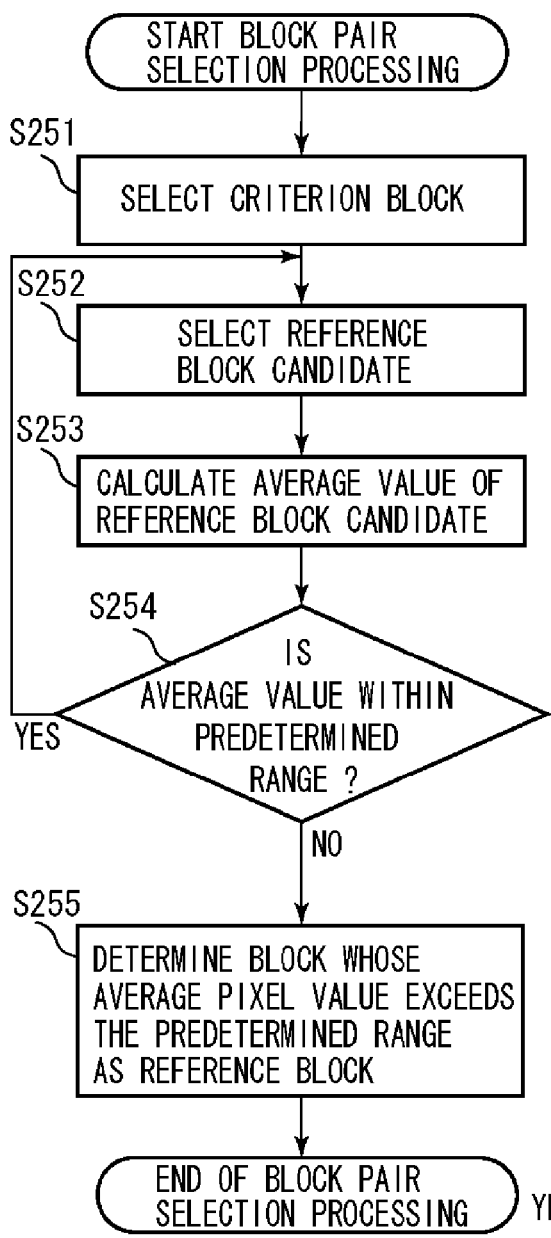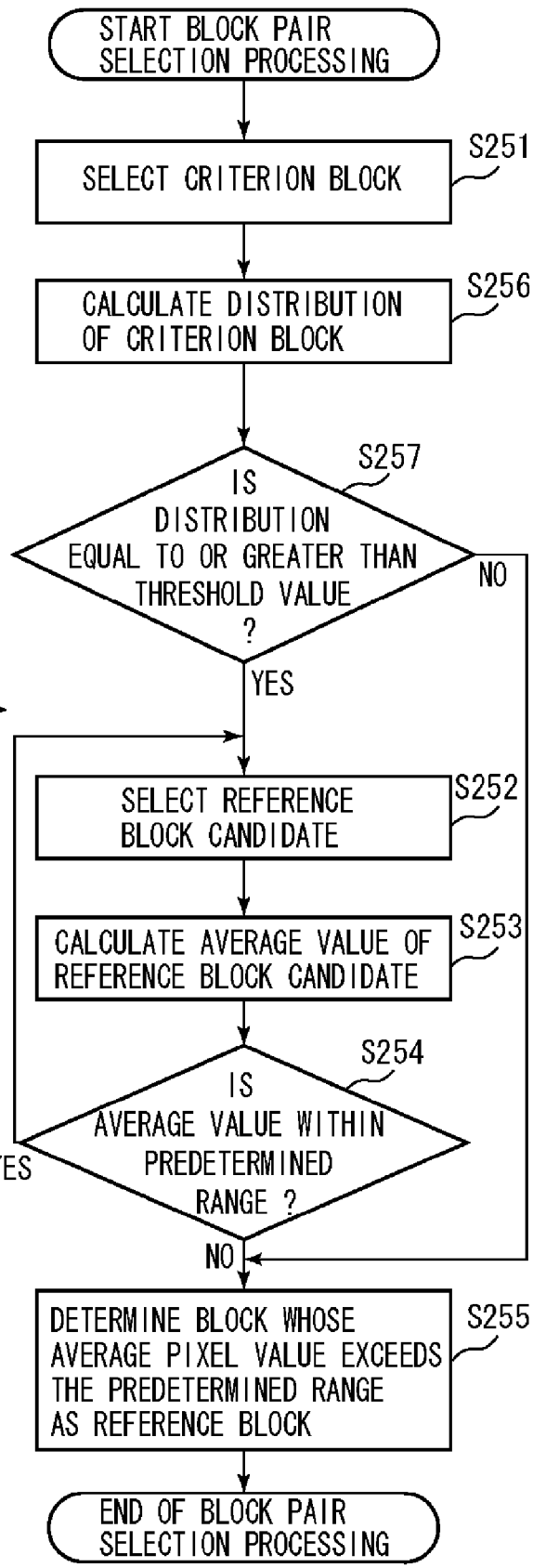

INFORMATION PROCESSING APPARATUS AND INFORMATION PROCESSING METHOD

BACKGROUND OF THE INVENTION

1. Field of the Invention

The present invention relates to a method for securing the authenticity of digital data.

2. Description of the Related Art

In recent years, an image (video) input apparatus, such as a digital camera, configured to digitize captured information and record the captured information on a recording medium as digital data has been widely used instead of a conventional silver-halide film camera or 8 mm-film camera. By using such a digital image input apparatus, a user can transmit the captured information itself to an information processing apparatus, such as a personal computer (PC), and display the captured information thereon. In addition, the user can momentarily transmit image data to anywhere around the world by transmitting the image data via a communication line.

Under such circumstances, an insurance company may utilize digital data to capture an image of an evidence for an accident. In addition, a construction company may utilize digital data to record progress at a construction site.

However, digital image data may be easily altered by using a commercial photo retouch tool. Accordingly, the authenticity of digital data is lower than that of a silver halide photograph. Therefore, the admissibility of digital data as evidence is very low.

In order to solve the above-described problem, U.S. Pat. No. 5,499,294 discusses a method in which secret information is previously held in a digital camera. In this method, when image data is captured by the digital camera, digital signature is provided to the captured image data within the digital camera by using the secret information. By executing verification processing using generated signature information after the shooting, the authenticity of the captured image data can be secured.

On the other hand, a conventional image (video) input apparatus such as a digital camera includes an operation mode for directly (without executing image processing) outputting image data converted into digital data by analog-to-digital (A/D)-converting an electric signal of an image taken by photoelectrically converting an optical image of an object using an imaging device such as a complementary oxide semiconductor (CMOS) or a charge-coupled device (CCD). The image data converted into digital data is hereinafter referred to as "RAW image data".

The above-described image sensor can basically detect the intensity of light only. Accordingly, the above-described conventional image input apparatus acquires color information using a color filter provided on the front surface of the image sensor. Accordingly, the image format of RAW image data includes only one color component for one pixel, which is determined by the type of the color filter.

Generally, if such RAW image data is output from a digital camera, the RAW image data is transmitted to a personal computer (PC). In this case, pixel interpolation processing is executed for the other color components using application software installed in the PC.

However, the method discussed in U.S. Pat. No. 5,499,294 does not discuss the above-described RAW image data pixel interpolation processing. Accordingly, if a digital signature has been provided to RAW image data (captured pixels) within the digital camera, an interpolation target pixel, which is newly generated from the captured pixel during pixel interpolation processing cannot be verified for authenticity. Therefore, if any interpolation target pixel has been altered, the alteration cannot be detected.

In this regard, if pixel interpolation processing provides three color components for each pixel, then one-third of pixels included in image data after the pixel interpolation are captured pixels. The other pixels (two-thirds of the image data constituting pixels) are interpolation target pixels. In this case, when the captured pixels has been provided with a digital signature, if the interpolation target pixels are altered instead of altering the captured pixels, the altered pixels having the signature may be verified to be authentic.

SUMMARY OF THE INVENTION

The present invention is directed to a method capable of properly securing the authenticity of image data whose RAW image data has been subjected to interpolation processing.

According to an aspect of the present invention, an information processing apparatus includes an input unit configured to input image data including a first pixel group, a second pixel group generated by interpolating the first pixel group and verification data of the first pixel group, a first verification unit configured to verify whether the first pixel group has been altered using the first pixel group and the verification data, a second verification unit configured to verify whether the second pixel group has been altered by determining whether the second pixel group and the first pixel group are in a predetermined relationship, and a determination unit configured to determine whether the image data has been altered based on results of the verification by the first verification unit and the second verification unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the present invention.

FIGS. 9A through 9H each illustrate an example of an image format and pixel arrangement information according to an exemplary embodiment of the present invention.

FIGS. 12A and 12B are flow charts each illustrating an exemplary flow of rectangular block pair selection processing according to the third exemplary embodiment of the present invention.

DETAILED DESCRIPTION OF THE EMBODIMENTS

Various exemplary embodiments, features, and aspects of the present invention will now be herein described in detail below with reference to the drawings. It is to be noted that the relative arrangement of the components, the numerical expressions, and numerical values set forth in these embodiments are not intended to limit the scope of the present invention.

Figure 1A:
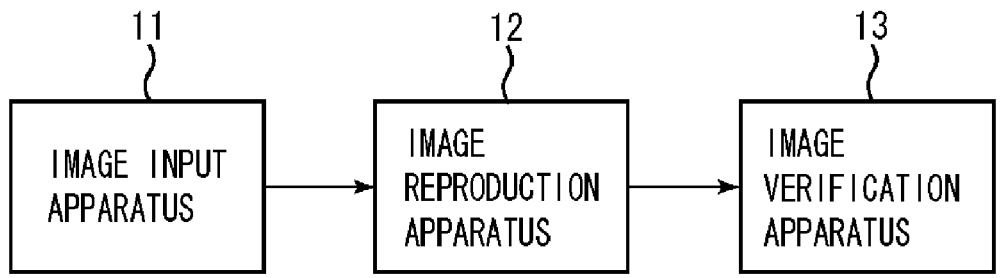
FIGS. 1A and 1B illustrate an example of the entire configuration of a system and an exemplary configuration of a host computer according to a first exemplary embodiment of the present invention.

FIG. 1A illustrates an example of the entire configuration of a system according to a first exemplary embodiment of the present invention. The system according to the present exemplary embodiment includes an image input apparatus 11, an image reproduction apparatus 12, and an image verification apparatus 13.

The image input apparatus 11 generates image data and outputs the generated image data. In the present exemplary embodiment, the image input apparatus 11 generates verification data as well as image data and outputs the verification data together with the image data. Here, the verification data is data used for verifying whether the image data has been altered.

Furthermore, in the present exemplary embodiment, the image input apparatus 11 outputs image data (RAW image data), which is acquired by AD-converting an electric signal of a captured image, which has been acquired by photoelectrically converting an optical image of an object by using an image sensor such as a CMOS or a CCD included in the image input apparatus 11. In outputting the RAW image data, the image input apparatus 11 does not execute any image processing on the RAW image data. The "RAW image data" will be described in detail below.

The image reproduction apparatus 12 executes various image processing on the RAW image data input by the image input apparatus 11. Furthermore, the image reproduction apparatus 12 outputs the image-processed image data.

Hereinbelow, the above-described image processing is collectively referred to as "image reproduction processing". The image reproduction processing includes various image processing, such as image interpolation processing, gamma correction processing, contrast correction processing, or white balance correction processing.

The image verification apparatus 13 verifies whether the image data input by the image reproduction apparatus 12 has been altered. In addition, the image verification apparatus 13 outputs a result of the verification.

The image input apparatus 11, the image reproduction apparatus 12, and the image verification apparatus 13 may be in communication with one another via a network, such as the Internet, to mutually exchange various data.

Alternatively, various data may be recorded (stored) on a storage medium, such as a removable medium, so that the storage medium can be used to exchange the data.

Figure 2A:
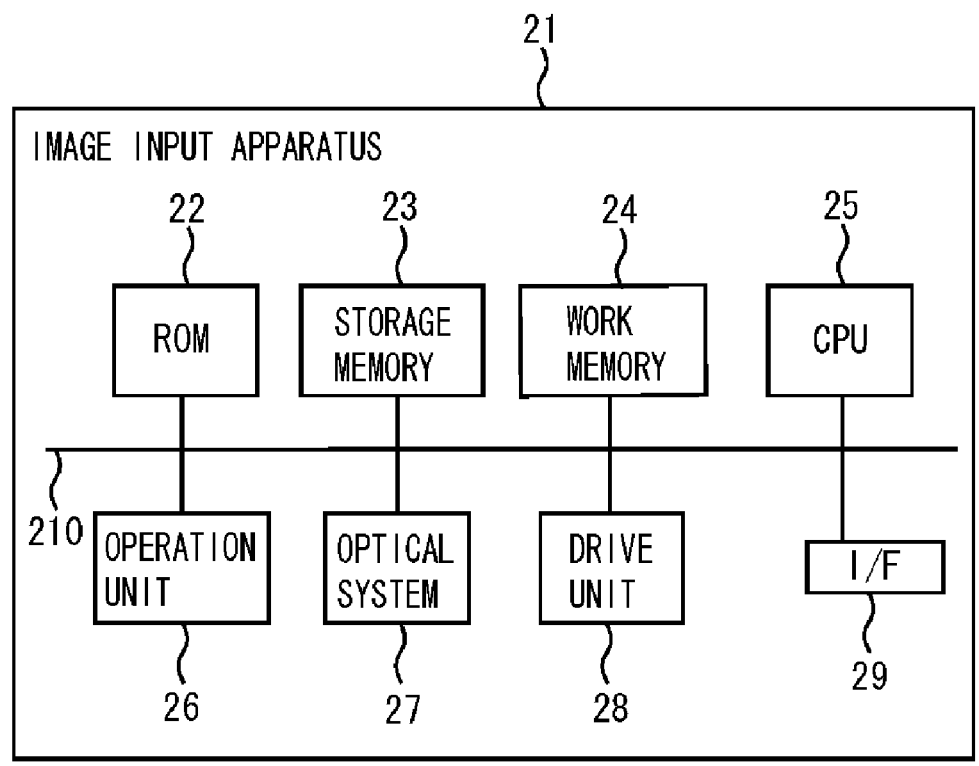
FIGS. 2A and 2B illustrate an exemplary configuration of an image input apparatus according to the first exemplary embodiment of the present invention.

FIG. 2A illustrates an example of a basic configuration of an image input apparatus that can be applied in the present exemplary embodiment.

Referring to FIG. 2A, an image input apparatus 21 according to the present exemplary embodiment includes a read-only memory (ROM) 22, a storage memory 23, a work memory 24, a central processing unit (CPU) 25, an operation unit 26, an optical system 27, a drive unit 28, and an interface (I/F) 29, which are in communication with one another via a bus 210. The image input apparatus 21 corresponds to the image input apparatus 11 illustrated in FIG. 1A.

The image input apparatus 21 is a common and general digital camera, for example. When a user has issued an instruction for shooting an image by operating the operation unit 26, the image input apparatus 21 can store digital image data generated by the optical system 27 on the storage memory 23.

The ROM 22 previously stores an operation program and common information necessary for generating verification data. The storage memory 23 stores processed image data. The work memory 24 temporarily stores image data. Compression of the image data and various calculation processing are executed on the work memory 24.

When the user has issued a shooting instruction, the CPU 25 executes various operation such as compression of image data and generation of verification data according to the program previously stored on the ROM 22. The operation unit 26 is a user interface for receiving various instructions such as a shooting instruction and an instruction for setting various parameters issued by the photographer (user).

The optical system 27 includes an optical sensor, such as a CCD or a CMOS. When the user has issued a shooting instruction, the optical system 27 executes processing for shooting of an object, processing on an electric signal, and processing on a digital signal. The drive unit 28 executes a mechanical operation necessary for shooting under control of the CPU 25.

The I/F 29 is an interface with an external apparatus, such as a memory card, a mobile terminal, or a communication apparatus. The I/F 29 is used for transmitting image data and verification data to the external apparatus.

Figure 1B:
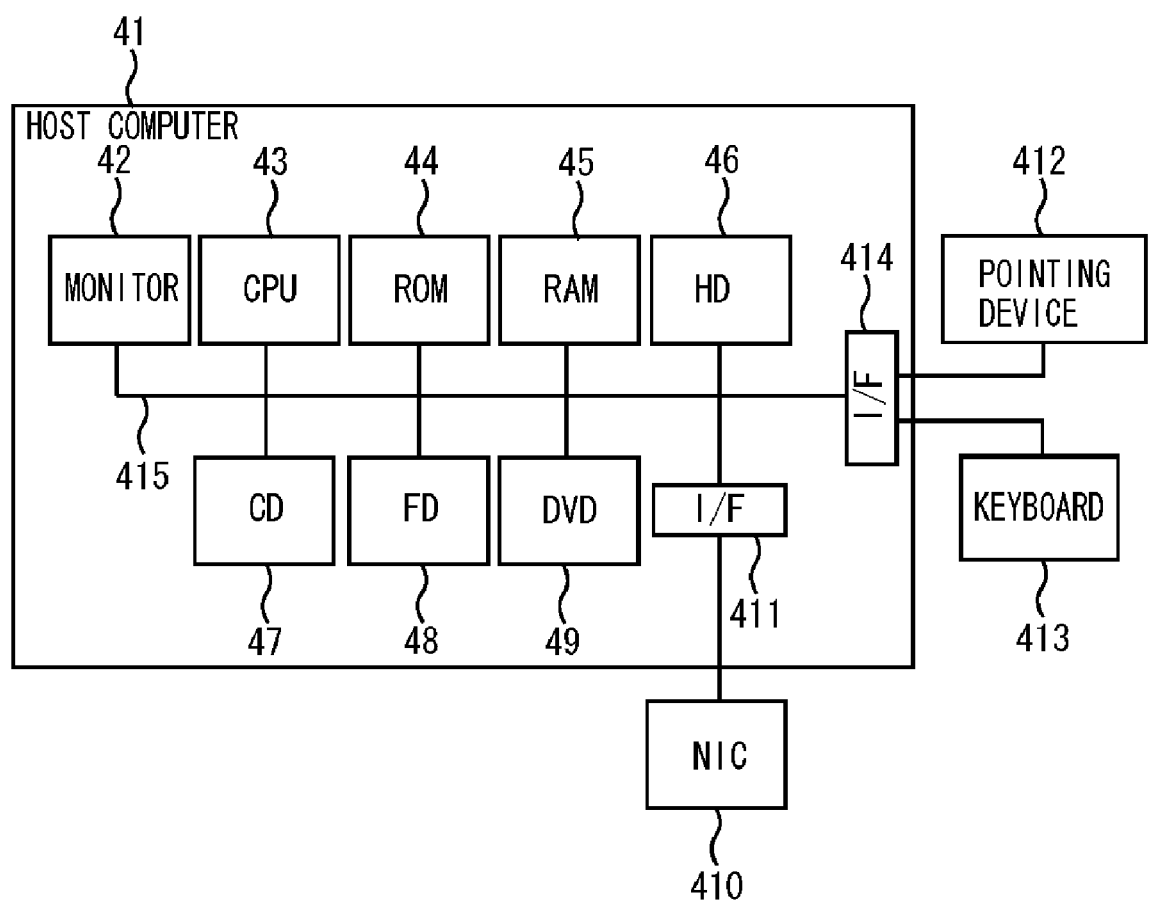

FIG. 1B illustrates an example of a basic configuration of a host computer that functions as the image reproduction apparatus 12 or the image verification apparatus 13. FIG. 1B further illustrates the relationship between the host computer and external apparatuses.

Referring to FIG. 1B, a host computer 41 is a general-purpose PC. The host computer 41 can store image data on a hard disk (HD) drive 46, a compact disc read-only memory (CD-ROM) drive 47, a floppy disc (FD) drive 48, or a digital versatile disc read-only memory (DVD-ROM) drive 49. In addition, the host computer 41 can display the stored image data on a monitor 42. Furthermore, the host computer 41 can transmit the image data via the Internet by using a network interface card (NIC) 410. The user can input various instructions by operating a pointing device 412 and a keyboard 413.

Within the host computer 41, the following blocks are in communication with one another via a bus 415. Thus, various data can be transmitted and received inside the host computer 41.

The monitor 42 can display various information from the host computer 41. A CPU 43 controls the operation of the components of the host computer 41. In addition, the CPU 43 can load and execute a program on a RAM 45. A ROM 44 stores a basic input output system (BIOS) and a boot program.

The RAM 45 temporarily stores a program and image data used by the CPU 43 to execute processing. An operating system (OS) and the program used by the CPU 43 to execute various processing are loaded on the RAM 45. The various processing will be described in detail below.

The HD drive 46 stores the OS and the program, which are to be transferred to the RAM 45. Furthermore, the HD drive 46 stores the image data during the operation by the host computer 41. In addition, the image data can be read from the HD drive 46.

The CD-ROM drive 47 is used for reading and writing the data stored on a compact disc-read only memory (CD-ROM) (a CD-recordable (CD-R) a CD-rewritable (CD-RW)), which is an external storage medium. The FD drive 48 is used for reading and writing data on and from an FD, as the CD-ROM drive 47.

The DVD-ROM drive 49 can be used for reading and writing data on and from a DVD-ROM or a DVD-RAM, as the CD-ROM drive 47. If an image processing program is stored on a CD-ROM, an FD, or a DVD-ROM, the program is installed on the HD 46 and is then transferred to the RAM 45 when used.

An I/F 411 is an interface for connecting the NIC 410 and the host computer 41, which is connected to a network such as the Internet. The image data stored on the RAM 45, the HD drive 46, the CD-ROM drive 47, the FD drive 48, or the DVD drive 49 can be transmitted to the network via the I/F 411. Furthermore, the host computer 41 can transmit and receive data to and from the Internet via the I/F 411.

An I/F 414 is an interface for connecting the pointing device 412 and the keyboard 413 to the host computer 41. Various instructions input via the pointing device 412 or the keyboard 413 can be input to the CPU 43 via the I/F 414.

Now, the functional configuration of the image input apparatus 11 according to the present exemplary embodiment will be described in detail below with reference to FIG. 2B. In the present exemplary embodiment, it is presumed that the image input apparatus 21 has been powered on and the OS has been loaded on the work memory 24.

However, the present invention is not limited to this. That is, it is also useful if the host computer 41 executes the following functions of the image input apparatus 11. In this case, each processing unit can be implemented by a corresponding program and the CPU 43, which executes the program. Alternatively, each processing unit can be implemented by peripheral hardware.

Figure 2B:
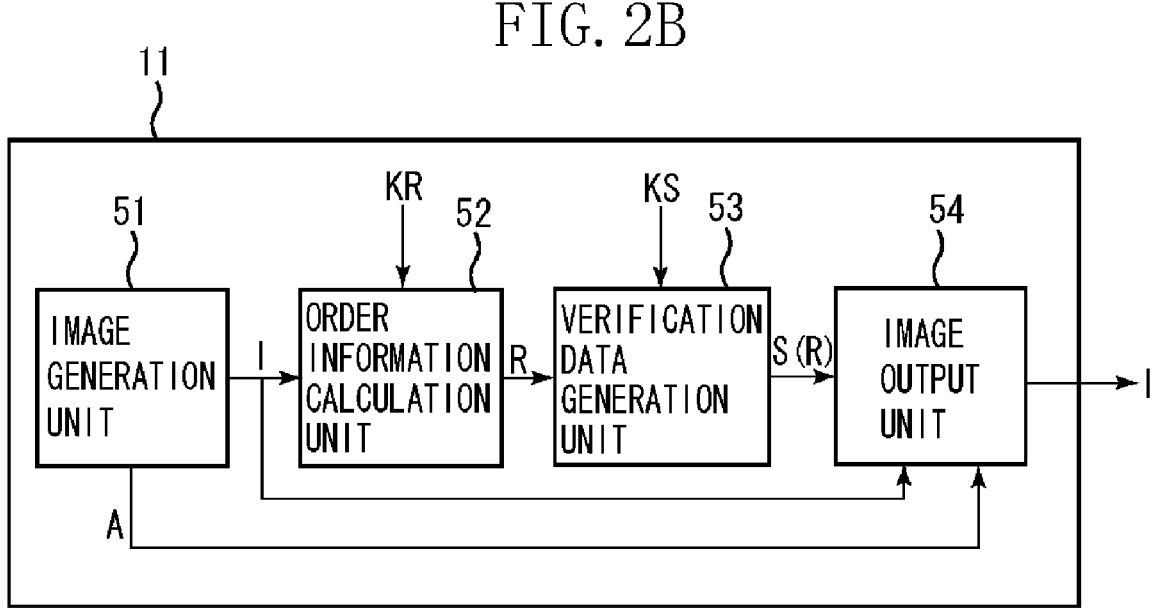

Referring to FIG. 2B, the image input apparatus 11 according to the present exemplary embodiment includes an image generation unit 51, an order information calculation unit 52, a verification data generation unit 53, and an image output unit 54. In the present exemplary embodiment, the image input processing can be implemented by software. In this case, it is to be considered that the above-described units and components are conceptual descriptions of functions necessary for executing the above-described processing.

The image generation unit 51 includes an optical sensor such as a CMOS or a CCD, which is implemented by the optical system 27. Furthermore, the image generation unit 51 includes a microprocessor that controls the optical system 27. The image generation unit 51 acquires a video signal generated by the optical system 27 and the optical sensor as image information. Furthermore, the image generation unit 51 generates image data I based on the acquired image information.

Now, the image data I according to the present exemplary embodiment will be described in detail below. FIG. 9A illustrates an exemplary structure of image data according to the present exemplary embodiment.

Referring to FIG. 9A, the image data according to the present exemplary embodiment constitutes a Bayer arrangement. In odd-numbered rows, data of a red (R) component and a green (G) component is arranged. In even-numbered rows, data of a green (G) component and a blue (B) component is arranged. The "Bayer arrangement" refers to the arrangement of color information to be detected by the above-described optical sensor such as CMOS or CCD.

Each pixel constituting the optical sensor can basically detect the intensity of light only. Accordingly, in usual cases, a color filter is provided on the front surface of the optical sensor to acquire color information. One type of methods for arranging color information on the color filter is called the "Bayer arrangement".

Four patterns can be applied as the Bayer arrangement illustrated in FIG. 9A according to which color component is to be assigned to each pixel. The four patterns will be described in detail below with reference to FIGS. 9E through 9H.

FIGS. 9E through 9H each illustrate to which color component each pixel of the image data I, which has been captured using the Bayer arrangement, corresponds. More specifically, FIGS. 9E through 9H each illustrate to which color component four pixels (2×2), which are located in the upper left portion of the image data I, correspond.

In this regard, in the example illustrated in FIG. 9E, the upper left pixel of the image data I corresponds to the red (R) component, the upper right pixel and the lower left pixel of the image data I correspond to the green (G) component, and the lower right pixel of the image data I corresponds to the blue (B) component.

It can be understood from FIGS. 9E through 9H that the four patterns illustrated therein are available according to the combination of the color components.

In the present exemplary embodiment, pixel arrangement information A, which is information indicating which of the four patterns illustrated in FIGS. 9E through 9H is used in generating the image data I, is generated. The generated pixel arrangement information A is temporarily stored on the work memory 24. Then, the image output unit 54 adds the pixel arrangement information A to the image data I.

By using the pixel arrangement information A, which is added to the image data I in the above-described manner, the present exemplary embodiment can identify to which color component each pixel constituting the image data I corresponds within an image verification apparatus. The image verification apparatus will be described in detail below.

In the present exemplary embodiment, it is supposed that the arrangement including color components of three colors (FIG. 9A) is applied. However, the present invention is not limited to this. That is, an arrangement including color components of four or more colors can be applied.

FIG. 9B illustrates an example of image data captured using the color filter for acquiring color information of four colors. In the odd-numbered row, data of a red (R) component and an emerald-color (E) component are arranged. In the even-numbered row, data of a green (G) component and a blue (B) component are arranged.

Furthermore, in the present exemplary embodiment, image data I is captured using an optical sensor and a color filter having a lattice-like pixel arrangement as illustrated in FIG. 9A. However, the present invention is not limited to this. That is, an optical sensor and a color filter having various different pixel arrangement methods can be applied.

FIG. 9C illustrates an example of an optical sensor and a color filter whose pixels are arranged in a honeycomb structure. If an optical sensor and a color filter illustrated in FIG. 9C are applied, it is useful to record a blue (B) component and a red (R) component in the first row, a green (G) component in the second row, and a red (R) component and a blue (B) component in the third row, as illustrated in FIG. 9D.

As described above, the present invention is not limited to using an optical sensor, a color filter, or an image format of a specific pixel arrangement. That is, an optical sensor, a color filter, or an image format of various other pixel arrangements can be used.

The image data I generated by the image generation unit 51 is then output to the order information calculation unit 52 and the image output unit 54. The image data I, which has been generated by the image generation unit 51, and a random number initial value KR are input to the order information calculation unit 52. Then, the order information calculation unit 52 generates order information R using the input random number initial value KR based on the image data I. Then, the order information calculation unit 52 outputs the generated order information R.

Now, the order information calculation unit 52 according to the present exemplary embodiment will be described in detail below with reference to FIG. 6A.

Figure 6A:
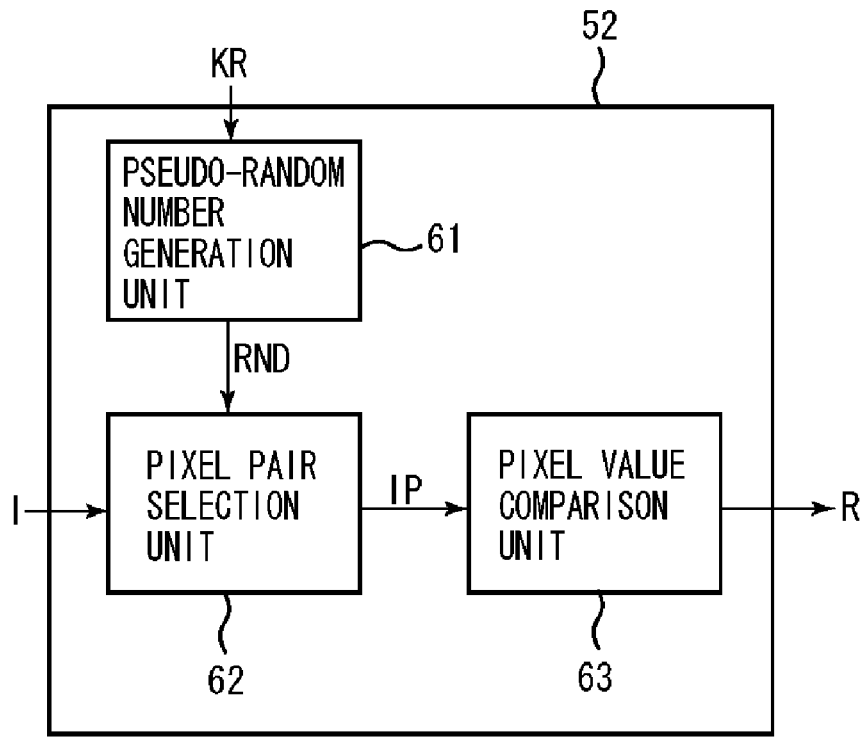
FIGS. 6A and 6B are block diagrams each illustrating an order information calculation unit according to the first exemplary embodiment of the present invention.

Referring to FIG. 6A, the order information calculation unit 52 according to the present exemplary embodiment includes a pseudo-random number generation unit 61, a pixel pair selection unit 62, and a pixel value comparison unit 63.

The pseudo-random number generation unit 61 generates a pseudo-random number RND using the input initial value KR as a seed. Then, the pseudo-random number generation unit 61 outputs the generated pseudo-random number RND to the pixel pair selection unit 62.

It is necessary for the image input apparatus 11 and the image verification apparatus 13 to share the initial value KR. Accordingly, secret information common to the ROM 22 of the image input apparatus 11 and the ROM 44 of the image verification apparatus 13 is previously stored. The verification data generation unit 53 can utilize the secret information as necessary.

Alternatively, it is also useful if the following configuration is applied. That is, a signature key KS is stored on a tamper resistant device, such as an integrated circuit (IC) card. In this case, the IC card is connected to the image input apparatus 11 and the image verification apparatus 13 and the verification data generation unit 53 acquires the signature key KS from the IC card and utilizes the acquired signature key KS.

The pixel pair selection unit 62 selects the positions of two pixels of the pixels constituting the image data I using the pseudo-random number RND generated by the pseudo-random number generation unit 61. The pixel pair selection unit 62 generates a pixel pair IP, which includes a plurality of pixel pairs, repeatedly executing processing for generating a pixel pair including the selected two pixels. Then, the pixel pair selection unit 62 outputs the generated pixel pair IP.

Now, an example of the pixel pair IP according to the present exemplary embodiment will be described in detail below with reference to FIG. 4A.

Figures 4A, 4B:
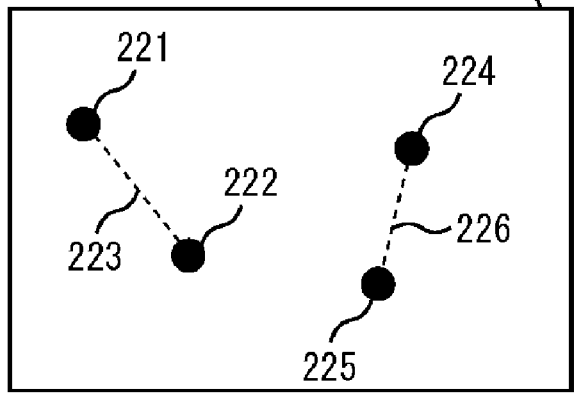
FIGS. 4A and 4B illustrate an example of a pixel pair and an exemplary method for calculating order information according to an exemplary embodiment of the present invention.

Referring to FIG. 4A, image data 227 includes pixels 221, 222, 224, and 225. The pixels connected with each other by a dotted line constitute a pixel pair. The pixel 221 and the pixel 222 constitute a pixel pair 223. The pixel 224 and the pixel 225 constitute a pixel pair 226. In this case, the pixel pair 223 and the pixel pair 226 are output as the pixel pair IP.

In the present exemplary embodiment, a pixel pair is selected from the pixels having the same color component in the image data (FIG. 9A). More specifically, if a red (R) component is selected as one pixel of a pixel pair, a red (R) component is selected with respect to the other pixel. The pixel pair is selected by using the image arrangement information A that has been added to the image data I.

In the gamma correction processing, the contrast correction processing, or the white balance correction processing, which are executed during the image reproduction processing, the magnitude relationship between different color components may vary although the magnitude relationship between the same color components may hardly vary.

Accordingly, in the present exemplary embodiment, the pixel pair IP is selected from the pixels having the same color components. Thus, the variation in the magnitude relationship between the pixel pair IP before and after the image reproduction processing can be prevented.

When the pixel pair IP is input to the pixel value comparison unit 63, the pixel value comparison unit 63 compares the pixel values constituting the input pixel pair. Then, the pixel value comparison unit 63 outputs the comparison result as the order information R.

In the present exemplary embodiment, the pixel value comparison unit 63 generates order information R using the following expression (1).

$$\text{If } c(i) < c(j) \text{ then } Rk=0 \text{ else } Rk=1 \qquad (1)$$

where "$c(x)$" denotes a pixel value at a pixel position x and "i" and "j" each denote a position of the pixel in the pixel pair selected by the pixel pair selection unit 62.

The present exemplary embodiment calculates a relative magnitude relationship $Rk$ for all pixel pairs IP using the expression (1). Then, a result of combining the calculated magnitude relationship values $Rk$ is output as order information R.

Now, an example of the method for calculating the magnitude relationship $Rk$ and the order information R will be described in detail below with reference to FIG. 4B.

Referring to FIG. 4B, image data 231 is a target of calculating the order information R. Each lattice indicates a pixel. In the present exemplary embodiment, it is supposed that the pixels have been captured using an optical sensor or a color filter having a pixel arrangement 232.

Furthermore, each red (R) component, green (G) component, and blue (B) component are assigned as a pixel arrangement 233 in order of scanning for rasterization from the upper-left portion. With respect to the red (R) component, CR(0)=128, CR(1)=121, CR(2)=118, and CR(3)=190.

Here, at first, the magnitude relationship Rk is calculated for the red (R) component. The pseudo-random number, the pixel pair IP, and the magnitude relationship Rk are described using a pixel arrangement 234. The pseudo-random number RND that has been generated by the pseudo-random number generation unit 61 for the red (R) component of the image data 231 corresponds to "i" and "j" in the pixel arrangement 234. The pixel pair IP selected by the pixel pair selection unit 62 is CR(i) and CR(j). In the pixel arrangement 234, two pixel pairs have been selected in total.

Then, the magnitude relationship Rk is calculated using the expression (1) for each pixel pair. In this regard, for example, with respect to the first pixel pair in the pixel arrangement 234, CR(i)=190 and C(j)=118. Therefore, C(i)>C(j). Therefore, the magnitude relationship Rk=1.

On the other hand, with respect to the second pixel pair, C(i)=121 and C(j)=128. Therefore, the condition C(i)>C(j) is not satisfied. Therefore, the magnitude relationship Rk=0.

The magnitude relationship Rk is calculated for the green (G) component and the blue (B) component using the above-described method. Furthermore, the magnitude relationship values Rk, which have been calculated for each of the red (R) component, the green (G) component, and the blue (B) component, are serially combined. Thus, order information R is generated. In the present exemplary embodiment, the order information R "10001110" is acquired as indicated by Rk values 235 in FIG. 4B.

In the present exemplary embodiment, as illustrated in FIG. 4A, the magnitude relationship Rk is calculated for all pixel pairs IP included in the image data I and the order information R acquired based thereon is output. However, the present invention is not limited to this. That is, it is also useful if the pixel pair IP of a part of the image data I is randomly selected using the pseudo-random number RND.

Furthermore, in the case where the magnitude relationship Rk is calculated for all pixel pairs IP included in the image data I and the order information R acquired based thereon is output, the pseudo-random number generation unit 61 is not always necessary. In this case, it is useful if all pixel pairs are selected in a predetermined order instead of selecting a pixel pair using the pseudo-random number RND.

Furthermore, in the present exemplary embodiment, two pixels are selected as the pixel pair IP. However, the present invention is not limited to this. That is, it is also useful if N (N is an integer greater than 2) pixels are selected and used as the pixel pair IP. In this case, the pixel pair selection unit 62 selects the pixel pair IP including N pixels. The pixel value comparison unit 63 calculates the magnitude relationship among the N pixel values and outputs the calculation result as the order information R.

Generally, N factorial magnitude relationship values can be obtained for the magnitude relationship of N pixel values. Therefore, for the magnitude relationship Rk of one pixel pair IP, the order information is generated in the bit length that can express the N factorial. More specifically, if N=3, then 3!=6 magnitude relationship values can be obtained as the magnitude relationship of the pixel value. Therefore, the magnitude relationship Rk can be expressed by a 3-bit digit string.

Referring back to FIG. 2B, when the order information R that has been generated by the order information calculation unit 52 is input to the verification data generation unit 53, the verification data generation unit 53 generates verification data S(R) for the input order information R. Then, the verification data generation unit 53 outputs the generated verification data S(R) to the image output unit 54.

For the verification data according to the present exemplary embodiment, Message Authentication Code (MAC) or a digital signature can be applied. The method for generating the MAC and the digital signature is known to persons skilled in the art. Accordingly, the description thereof will be omitted here.

If the MAC is applied as the verification data, secret information for generating the MAC is input as a signature key KS. The signature key KS is used in generating the MAC. It is necessary for the image input apparatus 11 and the image verification apparatus 13 to share the signature key KS. Accordingly, in the present exemplary embodiment, the ROM 22 of the image input apparatus 11 and the ROM 44 of the image verification apparatus 13 store the common secret information. The verification data generation unit 53 utilizes the secret information as necessary.

Alternatively, it is also useful if the following configuration is applied. That is, a signature key KS is stored on a tamper resistant device, such as an IC card. The IC card is connected to the image input apparatus 11 and the image verification apparatus 13. The verification data generation unit 53 acquires the signature key KS from the IC card and utilizes the acquired signature key KS.

Alternatively, it is also useful if new secret information is generated within the image input apparatus 11 and the generated secret information is utilized as the signature key KS. In this case, the generated secret information can be stored in a tamper resistant device such as an IC card. Furthermore, in this case, it is also useful if the generated secret information is encrypted and the encrypted secret information is transmitted to the image verification apparatus 13.

On the other hand, in the case where the digital signature is applied as the verification data, a private key for generating a digital signature is input as the signature key KS. In this case, the signature key KS is stored on the ROM 22 of the image input apparatus 11 and the verification data generation unit 53 utilizes the signature key KS as necessary.

Alternatively, it is also useful if the following configuration is applied. That is, a signature key KS is stored on a tamper resistant device, such as an IC card. In this case, the IC card is connected to the image input apparatus 11 and the verification data generation unit 53 acquires the signature key KS from the IC card and utilizes the acquired signature key KS.

Alternatively, it is also useful if a new signature key KS is generated within the image input apparatus 11 and the generated signature key KS is utilized.

In any of the above-described cases, a public key corresponding to the signature key KS utilized by the verification data generation unit 53 is necessary within the image verification apparatus 13.

Accordingly, the image output unit 54 adds a public key corresponding to the signature key KS to the image data and transmits the image data and the public key to the image verification apparatus 13.

Alternatively, it is also useful if the following configuration is applied. That is, a public key is stored on a server (not illustrated). Furthermore, information indicating the storage location of the public key on the server (information such as a uniform resource locator (URL)) is added to (recorded on) the image data. In this case, the image verification apparatus 13 uses the information about the storage location to acquire the public key from the server as necessary.

Referring back to FIG. 2B, when the image data I output from the image generation unit 51 and the verification data S(R) output from the verification data generation unit 53 are input to the image output unit 54, the image output unit 54 adds the verification data S(R) to the image data I and outputs the image data I added with the verification data S(R).

With respect to the method of adding the verification data S(R) to the image data I according to the present exemplary embodiment, the verification data S(R) is recorded in a header of the image data I, which has been formatted by Exif, for example. However, the present invention is not limited to this. That is, it is also useful if the verification data S(R) is combined with the image data I.

Furthermore, in the present exemplary embodiment, the pixel arrangement information A, which has been generated by the image generation unit 51 and stored on the work memory 24, is added to the image data I and the pixel arrangement information A is output together with the image data I. The image output unit 54 records the image data I on a storage medium such as a removable medium or transmits the image data I to a predetermined host apparatus via the network by wired or wireless communication.

Figure 14:
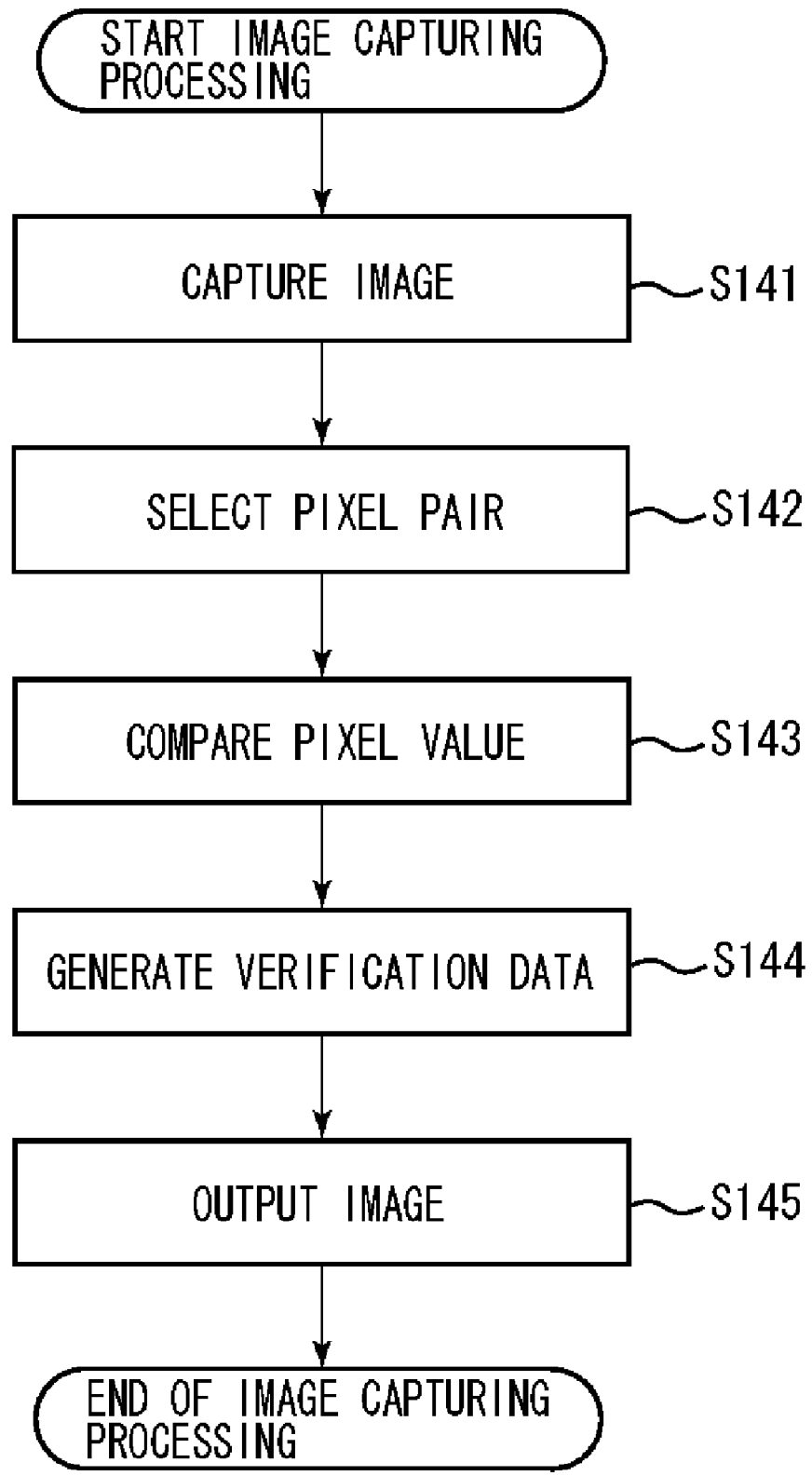
FIG. 14 is a flow chart illustrating an exemplary flow of image capturing processing according to the first exemplary embodiment of the present invention.

Now, an exemplary flow of shooting (image capturing) processing executed by the image input apparatus 11 according to the present exemplary embodiment will be described in detail below with reference to FIG. 14. FIG. 14 is a flow chart illustrating an example of the image capturing processing according to the present exemplary embodiment.

Referring to FIG. 14, in step S141, the image input apparatus 11 captures image data I using the image generation unit 51. In step S142, the pixel pair selection unit 62 selects a pixel pair IP using the pseudo-random number RND generated by the pseudo-random number generation unit 61. In step S143, the pixel value comparison unit 63 calculates the order information R of the pixel pair IP.

In step S144, the verification data generation unit 53 generates the verification data S(R) for the order information R. In step S145, the image output unit 54 outputs the image data I added with the verification data S(R).

Now, an exemplary functional configuration of the image reproduction apparatus 12 according to the present exemplary embodiment will be described in detail below with reference to FIG. 7.

Figure 7:
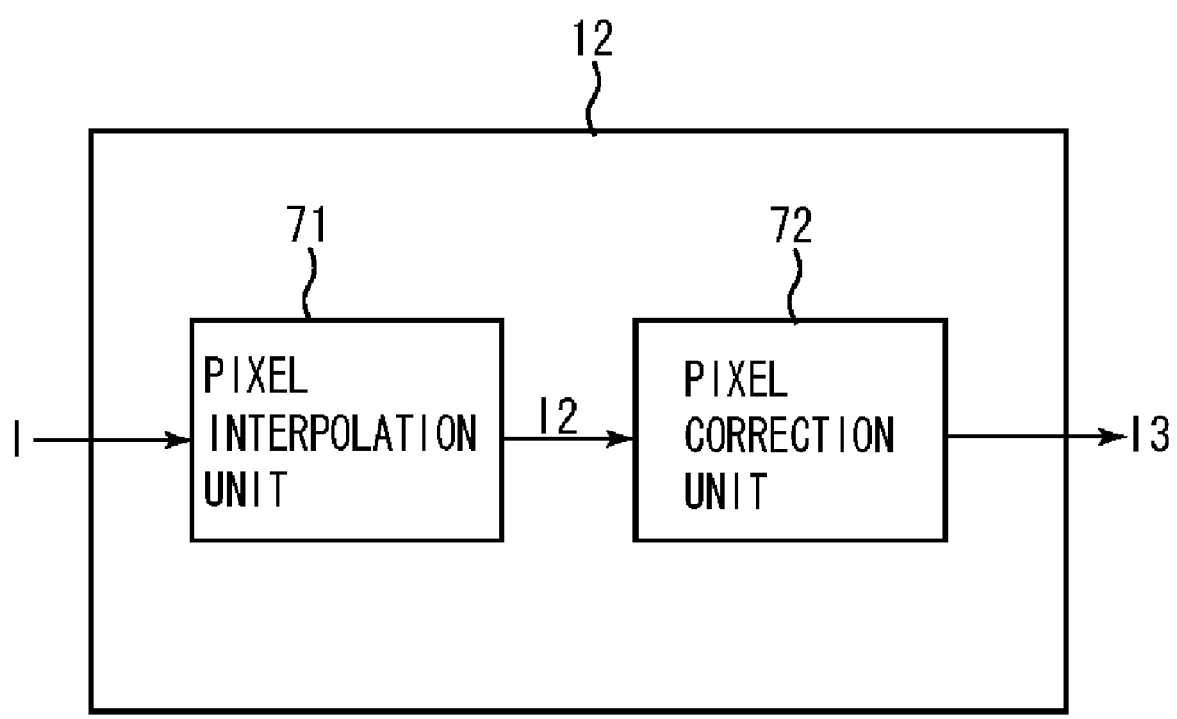
FIG. 7 illustrates an exemplary configuration of an image reproduction apparatus according to the first exemplary embodiment of the present invention.

Referring to FIG. 7, the image reproduction apparatus 12 includes a pixel interpolation unit 71 and a pixel correction unit 72.

When the image data I is input from the image input apparatus 11, the pixel interpolation unit 71 executes pixel interpolation processing on the input image data I. Then, the pixel interpolation unit 71 outputs image data I2, which has been subjected to the pixel interpolation processing.

Figure 10A:
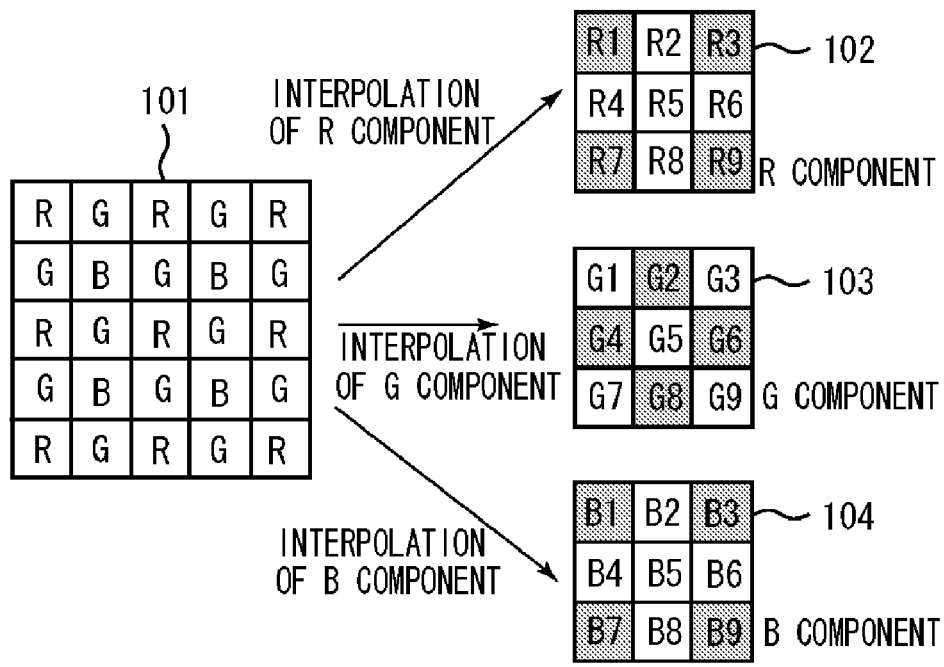
FIGS. 10A and 10B each illustrate exemplary pixel interpolation processing and captured pixel extraction processing according to an exemplary embodiment of the present invention.

The pixel interpolation processing according to the present exemplary embodiment will be described in detail below with reference to FIG. 10A. FIG. 10A illustrates exemplary pixel interpolation processing executed on image data having the image format illustrated in FIG. 9A.

Referring to FIG. 10A, image data 101 is image data before being subjected to the pixel interpolation processing. Image data 102, 103, and 104 has been subjected to the pixel interpolation processing for the red (R) component, the green (G) component, and the blue (B) component, respectively.

Among the image data 102, 103, and 104, the pixels indicated in a meshed state are captured pixels, namely, pixels included in the image data 101 (a first pixel group). On the other hand, among the image data 102, 103, and 104, the pixels indicated in a non-meshed state are newly interpolated pixels (a second pixel group).

As illustrated in FIG. 10A, in the pixel interpolation processing, the value of the pixel having no color component, among the captured image data, is interpolated by the value of an adjacent captured pixel. An example of the pixel interpolation processing on the red (R) component according to the present exemplary embodiment will be described below.

$$R2=(R1+R3)/2$$

$$R4=(R1+R7)/2$$

$$R6=(R3+R9)/2$$

$$R8=(R7+R9)/2$$

$$R5=(R1+R3+R7+R9)/4 \qquad (2)$$

In the present exemplary embodiment, as expressed in the expression (2), the average value of the pixel value of the adjacent captured pixels is used as the pixel value of the interpolation target pixel. In particular, if the number of adjacent captured pixels is two, the present exemplary embodiment calculates the average value of the two pixel values. If the number of adjacent captured pixels is four, the present exemplary embodiment calculates the average value of the four pixel values.

The pixel interpolation processing for the green (G) component and the blue (B) component can be executed using the expression (2). Accordingly, the detailed description thereof will not be repeated here.

In the present exemplary embodiment, the pixel interpolation processing is executed separately and independently for each color. However, the present invention is not limited to this. That is, the pixel interpolation processing can be executed in various different ways.

In this regard, a method can be applied that utilizes the ratio among the color components (the ratio of the red (R) component or the blue (B) component to the green (G) component, for example). Furthermore, a method can be also applied that detects the orientation of an edge, assigns weights to the captured pixel value according to the detected edge orientation, and interpolates the pixel.

Alternatively, it is also useful if a plurality of types of the pixel interpolation processing that can be executed by the pixel interpolation unit 71 is previously provided and appropriate pixel (image) interpolation processing is appropriately selected and executed at an appropriate timing. In this case, information for identifying the selected pixel (image) interpolation processing is output together with image data I3.

Alternatively, it is also useful if appropriate pixel (image) interpolation processing is executed according to the type of the image input apparatus 11. In this case, information for identifying the image input apparatus 11 is added to the image data I output from the image output unit 54 (FIG. 2B). Furthermore, the pixel interpolation unit 71 selects an appropriate pixel (image) interpolation processing according to the information for identifying the image input apparatus 11.

Returning to FIG. 7, when the image data I2, which has been subjected to the pixel interpolation processing by the pixel interpolation unit 71, is input to the pixel correction unit 72, the pixel correction unit 72 executes the pixel correction processing on the image data I2. Furthermore, the pixel correction unit 72 outputs the image data I3 that has been subjected to the pixel correction processing.

The image correction processing according to the present exemplary embodiment includes gamma correction processing, contrast correction processing, and white balance correction processing.

In the white balance correction processing, the following expression (3) is used for changing the value of the color component of each pixel constituting the image data I2.

$$R' = WR \times R$$
$$G' = WG \times G$$
$$B' = WB \times B \quad (3)$$

where "R", "G", and "B" each denote the value of the color component of each pixel before the white balance correction processing, "R'", "G'", and "B'" each denote the value of the color component of each pixel after the white balance correction processing, and "WR", "WG", and "WB" each denote a white balance correction value of each color component.

In the gamma correction processing, the following expression (4) is used for changing the value of the color component of each component constituting the image data I2.

$$R' = R'm \times (R/Rm)^{\wedge}(1/\gamma R)$$
$$G' = G'm \times (G/Gm)^{\wedge}(1/\gamma G)$$
$$B' = B'm \times (B/Bm)^{\wedge}(1/\gamma B) \quad (4)$$

where "R", "G", and "B" each denote the value of the color component of each pixel before the gamma correction processing, "R'", "G'", and "B'" each denote the value of the color component of each pixel after the gamma correction processing, "Rm", "Gm", and "Bm" each denote the maximum value of each color component before the gamma correction processing, "R'm", "G'm", and "B'm" each denote the maximum value of each color component after the gamma correction processing, "γR", "γG", and "γB" each denote a gamma correction value for each color component, and "x^y" denotes the y-th power of x.

Figure 8A:
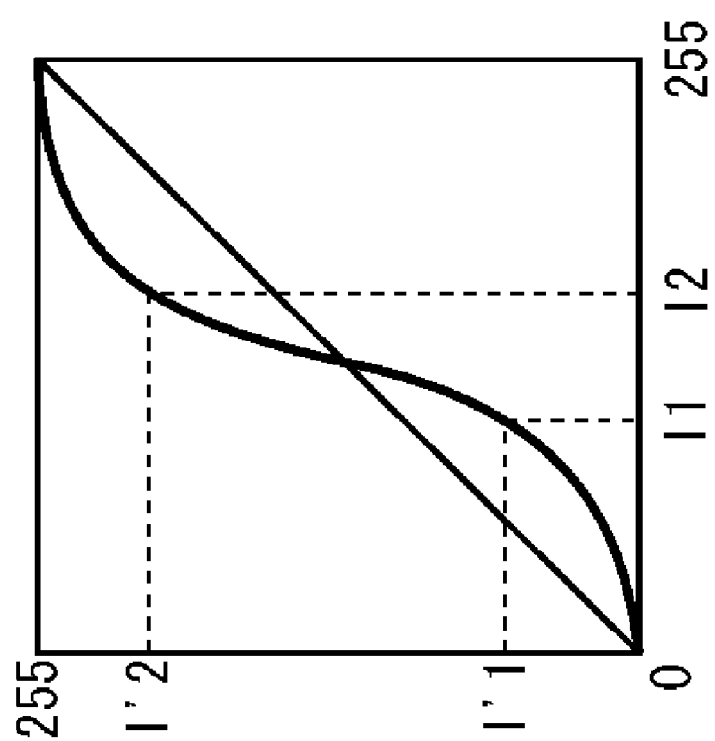
FIGS. 8A and 8B each illustrate exemplary image correction processing according to an exemplary embodiment of the present invention.

FIG. 8A illustrates the gamma correction processing expressed by the expression (4). Referring to FIG. 8A, the value of the color component before the gamma correction processing is taken on the horizontal axis. The value of the color component after the gamma correction processing is taken on the vertical axis. The value of each color component is corrected according to a gamma curve (a thick curve). The gamma curve is determined according to the value of γR, γG, or γB in the expression (4).

If the value of γR, γG, or γB is greater than 1, the color component is corrected to be darker. On the other hand, if the value of γR, γG, or γB is smaller than 1, the color component is corrected to be lighter. As illustrated in FIG. 8A, the color component whose value is a value I1 before the gamma correction processing is corrected to a value I'1 after the gamma correction processing.

Figure 8B:
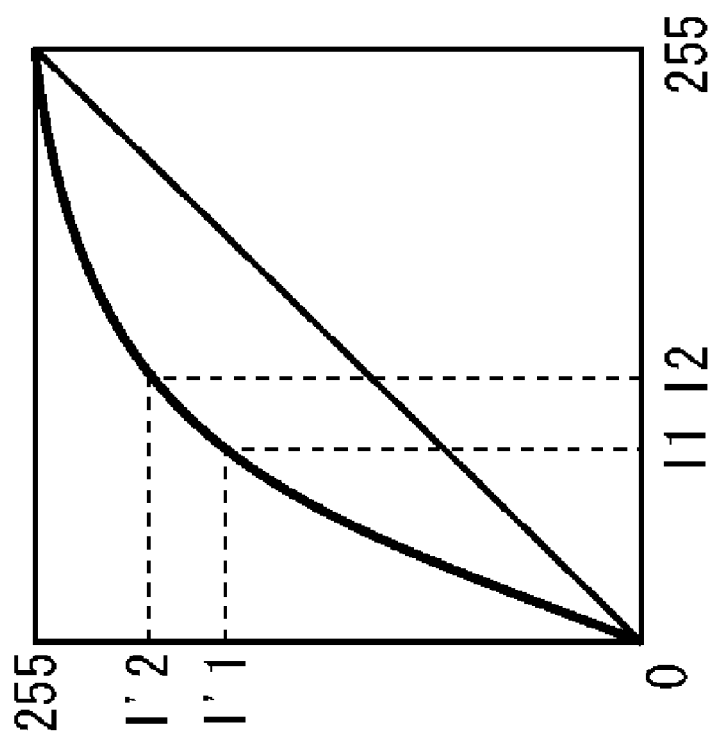

In correcting the contrast, the value of the color component of each pixel constituting the image data I2 is changed using a correction curve illustrated in FIG. 8B. That is, in the contrast correction processing, a dark color component is corrected to be darker while a light color component is corrected to be lighter. That is, as illustrated in FIG. 8B, the color component whose value is a value I1 before the contrast correction processing is corrected to a value I'1 after the contrast correction processing.

In the present exemplary embodiment, the above-described gamma correction processing, contrast correction processing, white balance correction processing, and processing including a combination thereof can be executed as image correction processing. In the present exemplary embodiment, it is useful if the gamma correction processing only is executed. Furthermore, it is also useful if the gamma correction processing is executed after executing the white balance correction processing and then the contrast correction processing is further executed.

In the present exemplary embodiment, the gamma correction processing, contrast correction processing, white balance correction processing, and processing including a combination thereof can be applied and executed as image correction processing. However, the present invention is not limited to this. That is, various other image processing can be applied.

Now, an exemplary functional configuration of the image verification apparatus 13 according to the present exemplary embodiment will be described in detail below with reference to FIG. 11A. In the following description, it is presumed that the host computer 41 has been powered on and the OS has been loaded on the RAM (work memory) 45.

Figure 11A:
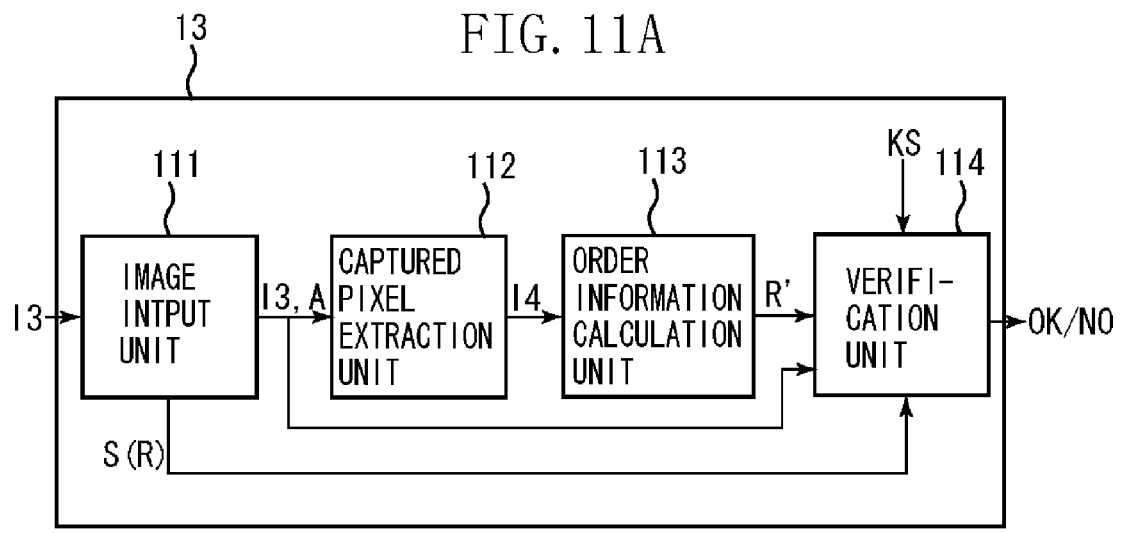
FIGS. 11A through 11C are block diagrams each illustrating an image verification apparatus according to an exemplary embodiment of the present invention.

Referring to FIG. 11A, the image verification apparatus 13 according to the present exemplary embodiment includes an image input unit 111, a captured pixel extraction unit 112, an order information calculation unit 113, and a verification unit 114.

The image verification processing according to the present exemplary embodiment can be implemented by executing processing by software. In this case, it is to be considered that the above-described units and components are conceptual descriptions of functions necessary for executing the above-described processing.

The image input unit 111 receives the input of the image data I3 reproduced by the image reproduction apparatus 12. More specifically, the image data I3, which has been output from the image reproduction apparatus 12, is input to the image input unit 111 via a removal medium and/or a network.

Furthermore, the image input unit 111 analyzes a header of the input image data I3. In addition, the image input unit 111 extracts the verification data S(R), which has been added to the image data I3, and the pixel arrangement information A. Furthermore, the image input unit 111 outputs the extracted verification data S(R) and pixel arrangement information A.

When the image data I3 and the pixel arrangement information A are input from the image input unit 111 to the captured pixel extraction unit 112, the captured pixel extraction unit 112 uses the pixel arrangement information A to extract a captured pixel. Furthermore, the captured pixel extraction unit 112 outputs image data I4, which includes the captured pixel.

The image data I3, which has been input to the captured pixel extraction unit 112, has become data whose one pixel includes three color components as a result of the interpolation processing executed by the above-described pixel interpolation unit 71.

The captured pixel extraction unit 112 identifies the color component which is assigned to each pixel based on the above-described image data I3 using the pixel arrangement information A to extract the identified color component only.

After acquiring the color components extracted in the above-described manner, the captured pixel extraction unit 112 generates the image data I4, whose one pixel includes one color component, and outputs the generated image data I4.

Now, captured pixel extraction processing executed by the captured pixel extraction unit 112 will be described in detail below with reference to FIG. 10B.

Figure 10B:
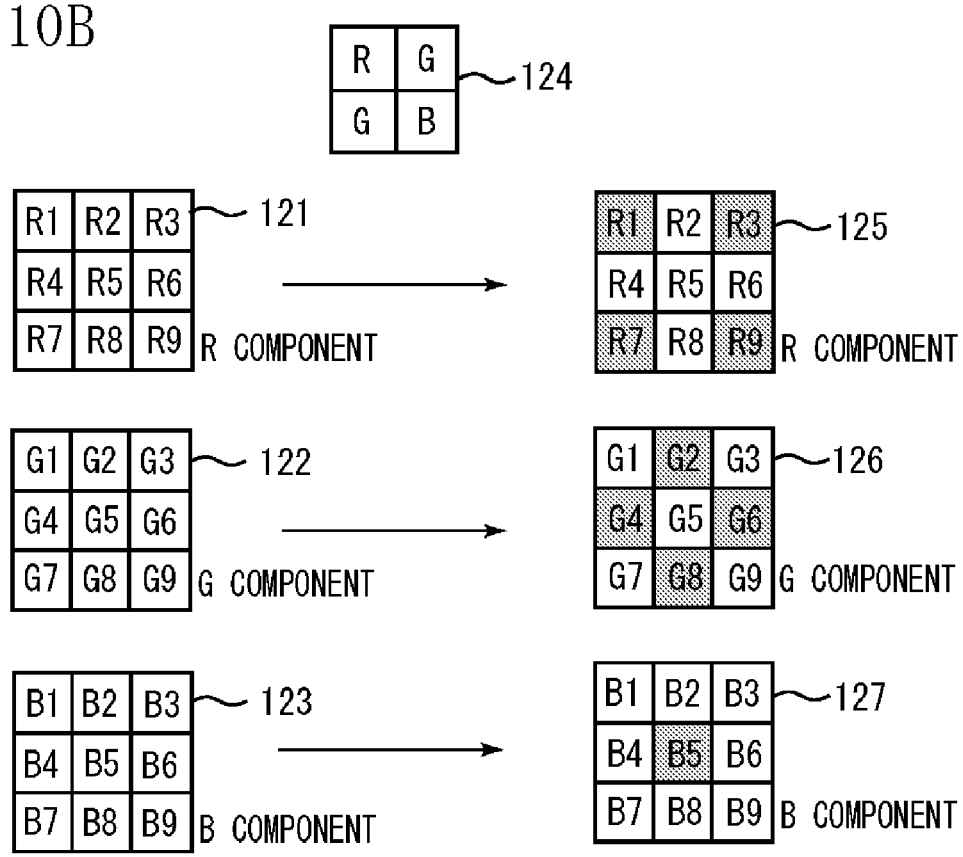

Referring to FIG. 10B, pixel arrangement patterns 121, 122, and 123 each includes nine (3×3) pixels in the upper left portion of the image data that has been subjected to the interpolation processing by the pixel interpolation unit 71. The pixel arrangement pattern 121 includes the red (R) components. The pixel arrangement pattern 122 includes the green (G) components. The pixel arrangement pattern 123 includes the blue (B) components.

Pixel arrangement information 124 is an example of the pixel arrangement information A. In the pixel arrangement information 124, the upper left pixel of the image data corresponds to the red (R) component, the upper right pixel and the lower left pixel of the image data correspond to the green (G) component, and the lower right pixel of the image data corresponds to the blue (B) component.

Pixel arrangement patterns 125, 126, and 127 each indicate which pixel of those constituting the pixel arrangement patterns 121 through 123 is a captured pixel. By referring to the pixel arrangement information (the pixel arrangement information A) 124, it can be known that the pixel indicated in a meshed state is a captured pixel.

When the image data I4 is input from the captured pixel extraction unit 112 to the order information calculation unit 113, the order information calculation unit 113 generates order information R' based on the input image data I4. Furthermore, the order information calculation unit 113 outputs the generated order information R'.

In the present exemplary embodiment, order information calculation processing executed within the order information calculation unit 113 is similar to the above-described order information calculation processing executed within the order information calculation unit 52 (FIG. 2B). Accordingly, the description thereof will not be repeated here.

The order information R', which has been generated by the order information calculation unit 113, the verification data S(R) and the pixel arrangement information A, which have been extracted by the image input unit 111, the image data I3, and the signature key KS are input to the verification unit 114. Then, the verification unit 114 verifies whether the image data I3 has been altered using the input data. Then, the verification unit 114 outputs the result of the verification (OK/NO).

Figure 13A:
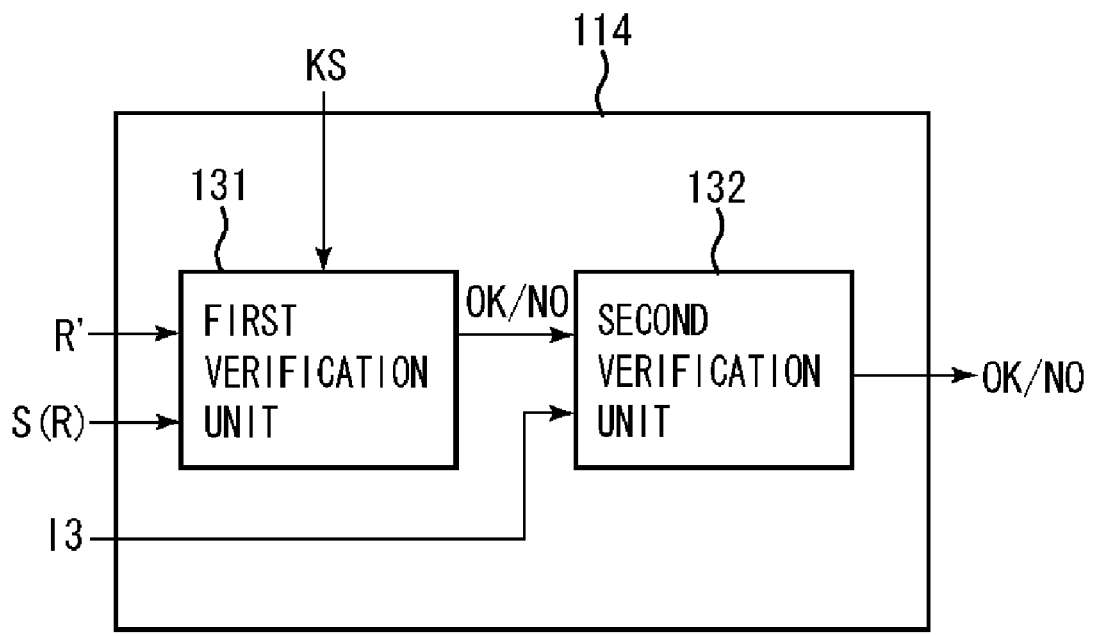
FIGS. 13A and 13B are block diagrams illustrating an exemplary configuration of a verification unit according to an exemplary embodiment of the present invention.

Now, the verification unit 114 according to the present exemplary embodiment will be described in detail below with reference to FIG. 13A. Referring to FIG. 13A, the verification unit 114 according to the present exemplary embodiment includes a first verification unit 131 and a second verification unit 132.

The first verification unit 131 verifies the image data I4 including the captured pixel. The second verification unit 132 verifies the image data including the pixels interpolated by using the captured pixels (the difference between the image data I3 and the image data I4). As a result, the verification unit 114 executes the verification of the image data I3.

The first verification unit 131 uses the order information R', the verification data S(R), and the signature key KS to execute verification of the signature or the MAC. Then, the first verification unit 131 outputs the result of the verification (OK/NO). More specifically, the order information R', the verification data S(R), and the verification key KS are input. Then, a digital signature or a MAC is generated based on the order information R' and the verification key KS. Note here that the processing for generating the digital signature or the MAC is similar to the above-described processing by the verification data generation unit 53. Accordingly, the description thereof will not be repeated here.

Furthermore, the first verification unit 131 compares the generated digital signature or MAC with the verification data S(R). If the generated digital signature or MAC matches the verification data S(R), then the first verification unit 131 outputs the verification result "OK". On the other hand, if the generated digital signature or MAC does not match the verification data S(R), then the first verification unit 131 outputs the verification result "NO". The above-described processing is hereafter referred to as "first verification processing".

It is necessary that the first verification processing executed by the first verification unit 131 corresponds to the above-described processing executed by the verification data generation unit 53. More specifically, if a MAC has been generated by the verification data generation unit 53, then the first verification unit 131 executes the verification processing using the MAC. On the other hand, if a digital signature has been generated by the verification data generation unit 53, then the first verification unit 131 executes the verification processing using the digital signature.

In this regard, the following must be considered. That is, if the MAC is used, the secret information that is equivalent to the signature key KS used by the verification data generation unit 53 is applied as the signature key KS. On the other hand, if the digital signature is used, the public key corresponding to the signature key KS used by the verification data generation unit 53 is applied as the signature key KS.

The result of the first verification processing by the first verification unit 131 and the image data I3, which is the target of the verification processing, are input to the second verification unit 132. Then, the second verification unit 132 verifies whether the input image data I3 has been altered. Furthermore, the second verification unit 132 outputs the verification result (OK/NO).

Figure 15:
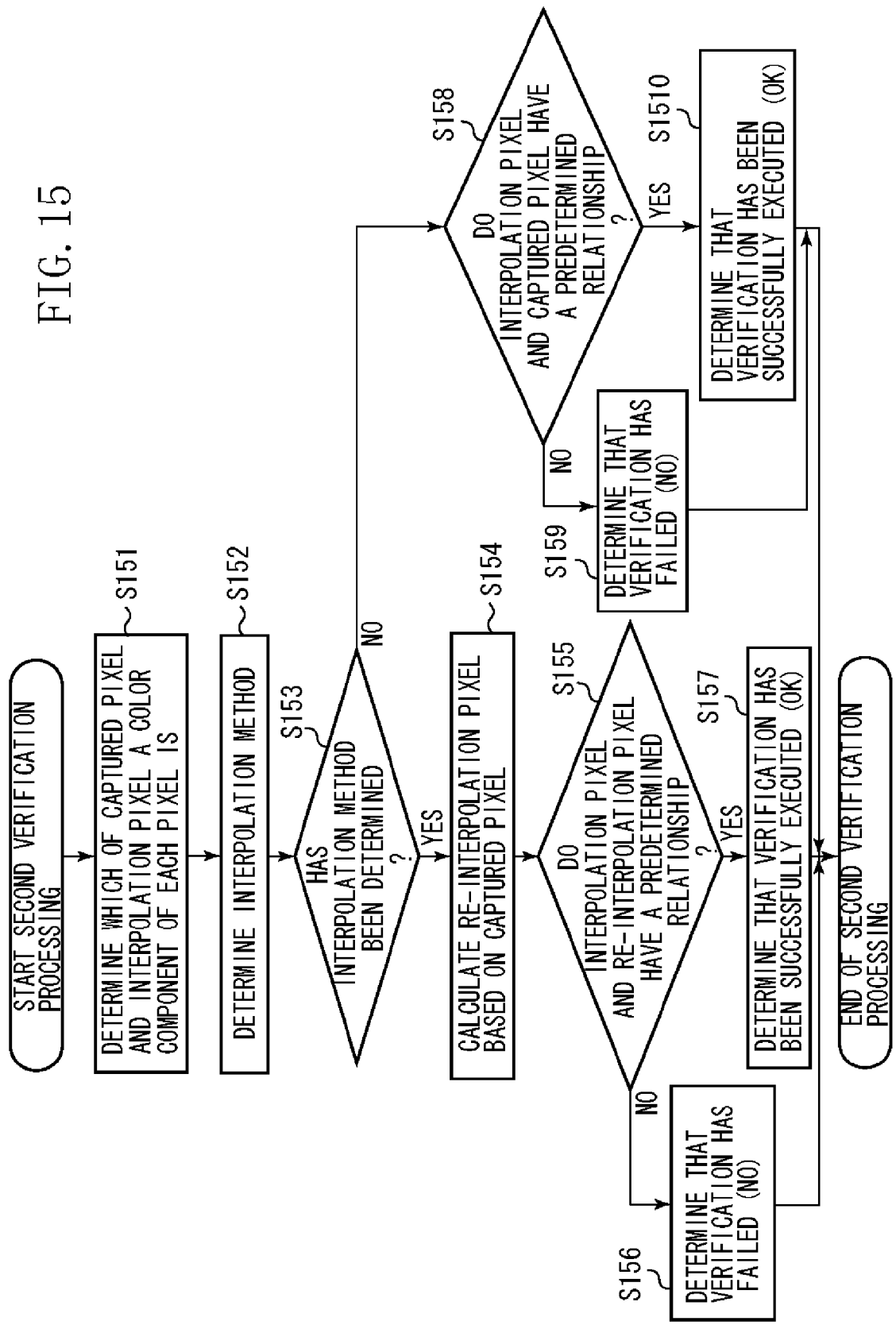
FIG. 15 is a flow chart illustrating an exemplary flow of second verification processing according to the first exemplary embodiment of the present invention.

Second verification processing executed within the second verification unit 132 according to the present exemplary embodiment will be described in detail below with reference to FIG. 15. FIG. 15 is a flow chart illustrating an exemplary flow of the second verification processing according to the present exemplary embodiment.

Referring to FIG. 15, in step S151, the second verification unit 132 uses the pixel arrangement information A to identify which of a captured pixel or an interpolation target pixel each color component of each pixel of the image data I3 is. The identification processing in step S151 is similar to the above-described processing by the captured pixel extraction unit 112. Here, the pixel that has not been extracted as the captured pixel is identified as an interpolation target pixel.

More specifically, in the example illustrated in FIG. 10B, the pixels indicated in the pixel arrangement patterns 125 through 127 in a meshed state are captured pixels, while the pixels indicated in a non-meshed state are reference target pixels.

In step S152, the second verification unit 132 determines by what method the interpolation target pixel has been interpolated by the pixel interpolation unit 71 (FIG. 7).

In the present exemplary embodiment, the following configuration can be applied. That is, information indicating the type of (the method used in) the interpolation processing by the pixel interpolation unit 71 is added to the image data I3 and the added information is output together with the image data I3. In this case, the pixel interpolation unit 71 can identify the interpolation method using the information indicating the type of (the method used in) the interpolation processing.

Alternatively, the following configuration can be applied. That is, if the pixel (image) interpolation processing is executed by the pixel interpolation unit 71 according to the type of the image input apparatus 11, the type (the model name or the like) of the image input apparatus 11 is added to the image data I. Then, the image output unit 54 outputs the type of the image input apparatus 11 together with the image data I. In this case, the pixel interpolation unit 71 can identify the interpolation method using the information indicating the type of the image input apparatus 11.

In step S153, the second verification unit 132 determines whether the interpolation method has been identified in step S152.

If it is determined that the interpolation method has been identified (YES in step S153), then the processing advances to step S154. On the other hand, if it is determined that the interpolation method has not been identified (NO in step S153), then the processing advances to step S158.

In step S154, the second verification unit 132 uses the interpolation method identified in step S152 to calculate the interpolation target pixel again based on the captured pixel identified in step S151. Hereinbelow, the interpolation target pixel calculated in step S154 is simply referred to as a "re-interpolation target pixel".

If the interpolation method identified in step S152 is the method expressed by the expression (2), then a method equivalent to the method expressed by the expression (2) is applied as expressed by the following expression (5).

$$R2'=(R1+R3)/2$$

$$R4'=(R1+R7)/2$$

$$R6'=(R3+R9)/2$$

$$R8'=(R7+R9)/2$$

$$R5'=(R1+R3+R7+R9)/4 \qquad (5)$$

where "R2'," R4', "R6'," R8', and "R5' each denote a re-interpolation target pixel.

In step S155, the second verification unit 132 determines whether the identified captured pixel and the re-interpolation target pixel are in a predetermined relationship.

If it is determined that the identified captured pixel and the re-interpolation target pixel are in a predetermined relationship (YES in step S155), then the processing advances to step S157. In step S157, the second verification unit 132 determines that the verification has been successfully completed (OK). On the other hand, if it is determined that the identified captured pixel and the re-interpolation target pixel are not in a predetermined relationship (NO in step S155), then the processing advances to step S156. In step S156, the second verification unit 132 determines that the verification has not been successfully completed (NO).

In the present exemplary embodiment, the second verification unit 132 calculates the difference between the re-interpolation target pixel calculated in step S154 and the value of the interpolation target pixel identified in step S151.

If the value of the calculated difference is smaller than a predetermined threshold value or if the difference is "0", then the second verification unit 132 determines that the verification has been successfully completed (OK).

In this regard, for example, the second verification unit 132 can determines whether the difference between a value R2' of the re-interpolation target pixel calculated using the above-described expression (5) and a value R2 of the interpolation target pixel identified in step S151 is equal to or smaller than the predetermined threshold value.

On the other hand, in step S158, the second verification unit 132 determines whether the identified captured pixel and the interpolation target pixel are in a predetermined relationship.

If it is determined that the identified captured pixel and the interpolation target pixel are in a predetermined relationship (YES in step S158), then the processing advances to step S1510. In step S1510, the second verification unit 132 determines that the verification has been successfully completed ("OK"). On the other hand, if it is determined that the identified captured pixel and the interpolation target pixel are not in a predetermined relationship (NO instep S158), then the processing advances to step S159. In step S159, the second verification unit 132 determines that the verification has failed ("NO").

In the present exemplary embodiment, if the value of the interpolation target pixel is included in the value of captured pixels adjacent to the interpolation target pixel in the horizontal and vertical directions, then the second verification unit 132 determines that the verification has been successfully completed.

With respect to the green (G) component in the pixel arrangement information 124 (FIG. 10B), for example, the second verification unit 132 determines whether captured pixels G2, G4, G6, and G8 and an interpolation target pixel G5 are in the following relationship.

$$G2<G5<G8 \text{ AND } G4<G5<G6 \qquad (6)$$

Alternatively, it is useful that the second verification unit 132 determines that the verification has been successfully completed ("OK") if the value of the interpolation target pixel is included in a range between the minimum value and the maximum value of the value of the adjacent captured pixel.

With respect to the green (G) component illustrated in the pixel arrangement information 124 (FIG. 10B), for example, the second verification unit 132 determines whether the following relationship exists.

$$\text{Min}(G2, G4, G6, G8)<G5<\text{Max}(G2, G4, G6, G8) \qquad (7)$$

where "Min( )" denotes the minimum value of the value included in the argument, and "Max( )" denotes the maximum value of the value included in the argument.

Alternatively, the second verification unit 132 can determine that the verification has been successfully completed ("OK") if the absolute value of the difference between the value of the interpolation target pixel and the medium value of the values of the adjacent captured pixels (if the number of the values of the captured pixels is even, the average value of two values closest to the center of the values) is equal to or smaller than a predetermined threshold value.

In the case of the green (G) component indicated in the pixel arrangement information 124 (FIG. 10B), the second verification unit 132 determines whether the following relationship exists.

$$|G5-\text{Med}(G2, G4, G6, G8)|<T \qquad (8)$$

where "Med( )" denotes a median value included in the argument, "|x|" denotes the absolute value of x, and "T" denotes the predetermined threshold value.

Alternatively, the following configuration can be applied. That is, data of a captured image, which includes captured pixels only, and data of an image to be interpolated, which includes interpolation target pixels only, is generated. Then, the degree of similarity (a cross-correlation value or the like) between the generated image data is calculated. If the similarity degree is equal to or greater than the predetermined threshold value, then the second verification unit 132 determines that the verification has been successfully completed ("OK").

However, the present invention is not limited to the method for determining whether the above-described predetermined relationship exists. That is, various other relationships between the interpolation target pixel and the captured pixel can be used.

In either of the above-described cases, in step S152, the second verification unit 132 determines whether the interpolation target pixel has been altered according to a result of the determination as to whether the captured pixel and the interpolation target pixel are in a predetermined relationship.

Figure 16:
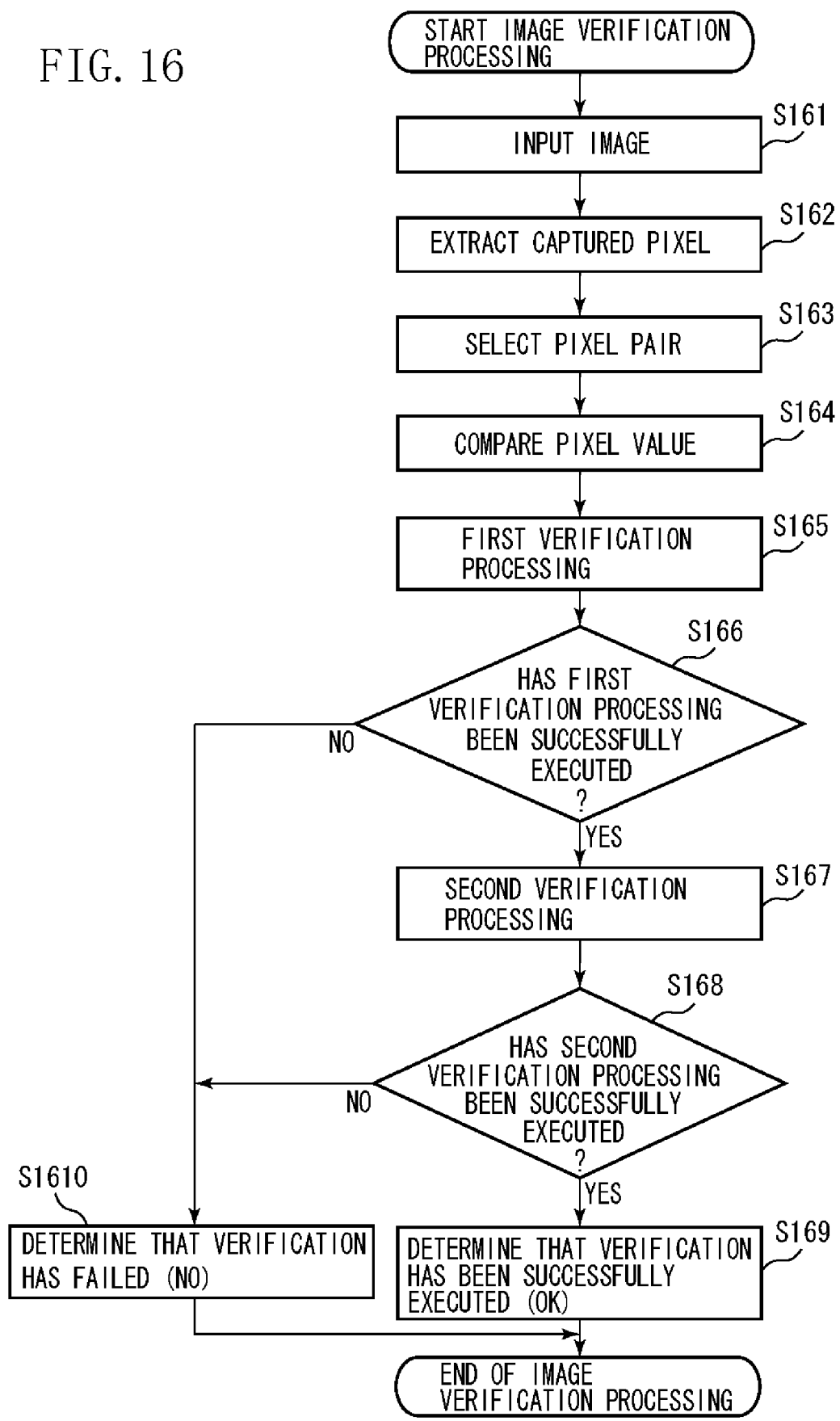
FIG. 16 is a flow chart illustrating an exemplary flow of image verification processing according to the first exemplary embodiment of the present invention.

Now, an exemplary flow of image verification processing executed by the image verification apparatus 13 according to the present exemplary embodiment will be described in detail below with reference to FIG. 16. FIG. 16 is a flow chart illustrating an example of the image verification processing according to the present exemplary embodiment.

Referring to FIG. 16, in step S161, the image verification apparatus 13 uses the image input unit 111 to input the image data I3. In step S162, the image verification apparatus 13 extracts the captured pixel data I4 from the image data I3 using the captured pixel extraction unit 112.

In step S163, the pixel pair selection unit 62 selects a pixel pair IP using the pseudo-random number RND generated by the pseudo-random number generation unit 61. In step S164, the pixel value comparison unit 63 calculates the order information R' of the pixel pair IP selected by the pixel value comparison unit 63.

In step S165, the image verification apparatus 13 executes the first verification processing using the first verification unit 131. In step S166, the image verification apparatus 13 determines whether the verification processing has been successfully completed. If it is determined that the verification processing has been successfully completed (YES in step S166), then the processing advances to step S167. On the other hand, if it is determined that the verification processing has failed (NO in step S166), then the processing advances to step S1610.

In step S167, the second verification unit 132 executes the second verification processing. In step S168, the image verification apparatus 13 determines whether the second verification processing has been successfully completed. If it is determined that the second verification processing has been successfully completed (YES in step S168), then the processing advances to step S169. On the other hand, if it is determined that the second verification processing has failed (NO in step S168), then the processing advances to step S1610.

In step S169, the image verification apparatus 13 determines that the image has been successfully verified (the image has not been altered). In step S1610, the image verification apparatus 13 determines that the image has not been successfully verified (the image has been altered). Then, the processing ends.

With the above-described configuration, in the present exemplary embodiment, the order information calculation unit 52 generates verification data according to the order information (the magnitude relationship) of the image data constituting the image data I instead of generating verification data based directly on the image data I generated by the image generation unit 51. Accordingly, the present exemplary embodiment can appropriately execute the verification processing even if the image data I has been subjected to the image correction processing by the pixel correction unit 72.

That is, as illustrated in FIGS. 8A and 8B, the present exemplary embodiment utilizes the following characteristic of order information. More specifically, if the pixel values I1 and I2 have been changed to the values I'1 and I'2, respectively, due to the image correction processing, the order information (the magnitude relationship) thereof does not change.

Furthermore, in executing verification on the image verification apparatus 13, the first verification unit 131 verifies the captured pixel for which the verification data S(R) has been generated. In addition, the second verification unit 132 verifies the interpolation target pixel that has been interpolated by the pixel interpolation unit 71. With the above-described configuration, the present exemplary embodiment can verify whether the interpolation target pixel has been altered as well as whether the captured pixel has been altered using the verification data.

In the present exemplary embodiment, within the image input device 11, the verification data generation unit 53 generates the verification data S(R) for the order information R, which has been calculated by the order information calculation unit 52. However, the present invention is not limited to the method that uses the order information R. That is, it is also useful if the verification data generation unit 53 generates the verification data S(R) for various characteristic amounts F, which are calculated based on the image data I.

Figure 18A:
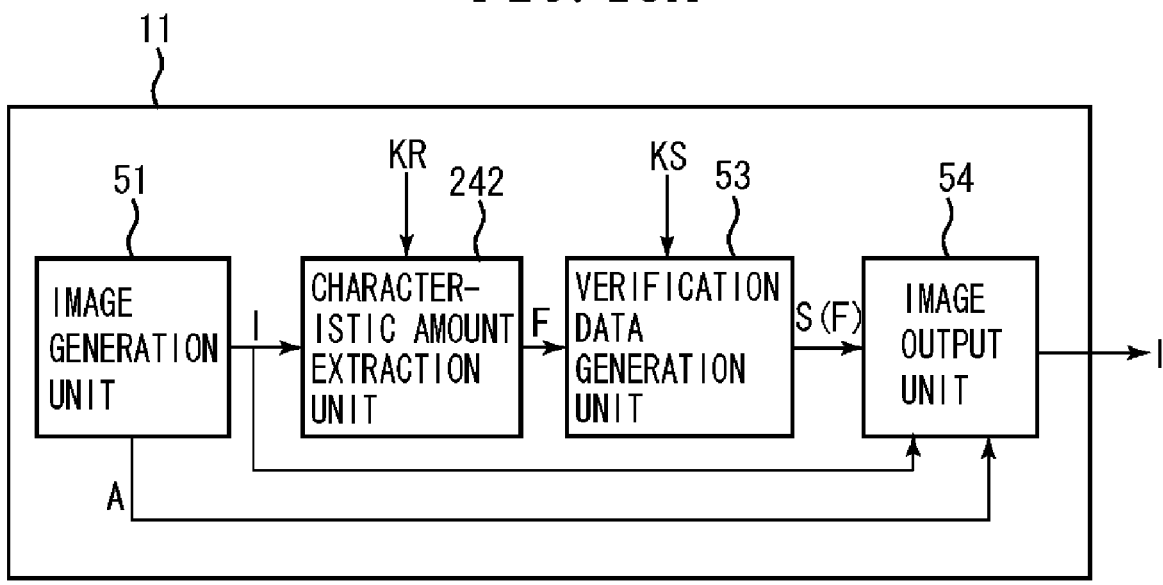
FIGS. 18A and 18B each illustrate an exemplary configuration of an image input apparatus according to a modification of the first exemplary embodiment the present invention.

In this case, as illustrated in FIG. 18A, the image input device 11 includes a characteristic amount extraction unit 242 in substitution for the order information calculation unit 52. Furthermore, in this case, the characteristic amount extraction unit 242 can generate verification data S (F) for the characteristic amount F extracted based on the image data I.

The characteristic amount is not limited to a specific characteristic amount. That is, various characteristic amounts can be used such as the low-frequency component, edge information, or a quantization coefficient of the image data I, or a combination thereof.

Figure 19A:
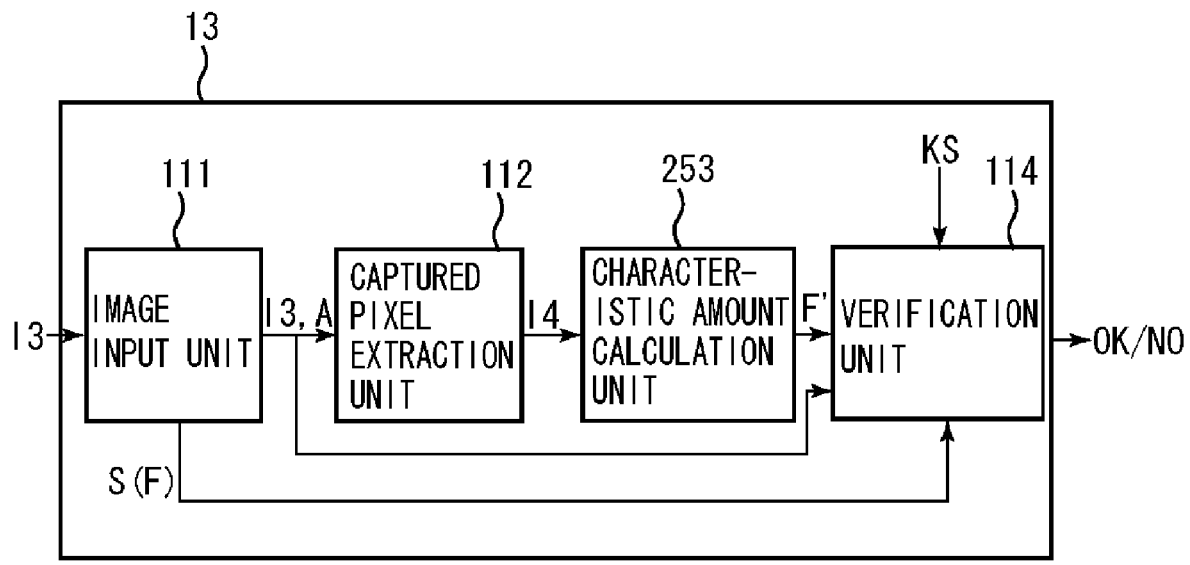
FIGS. 19A and 19B each illustrate an exemplary configuration of an image verification apparatus according to a modification of the first exemplary embodiment the present invention.

FIG. 19A illustrates an exemplary configuration of the image verification apparatus 13 if verification data for the characteristic amount F has been generated instead of the order information R.

In the example illustrated in FIG. 19A, a characteristic amount calculation unit 253 can be used to execute the extraction instead of the order information calculation unit 113 (FIG. 11A). In this case, the verification unit 114 can execute the verification using the characteristic amount F extracted from the image data I by the characteristic amount calculation unit 253.

Furthermore, in the present exemplary embodiment, it is not always necessary to generate verification data for a characteristic amount F such as the order information R. That is, it is also useful if verification data of the captured image data I or a part thereof.

Figure 18B:
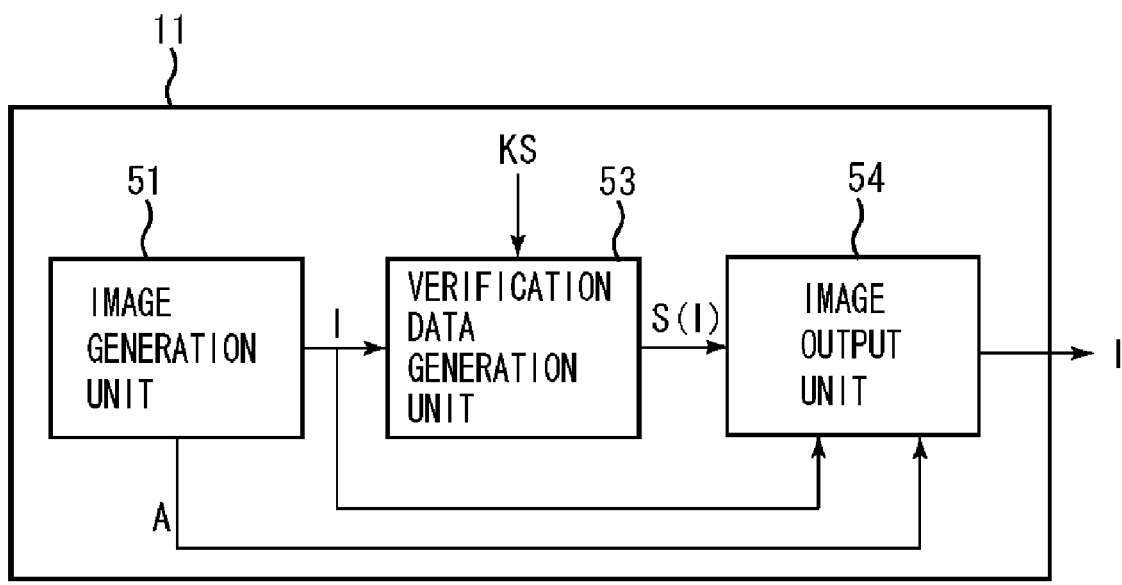

In this case, as illustrated in FIG. 18B, the image input device 11 can directly input the image data I, which has been generated by the image generation unit 51, to the verification data generation unit 53. Furthermore, in this case, the verification data generation unit 53 can generate verification data S(I) for the image data I.

Figure 19B:
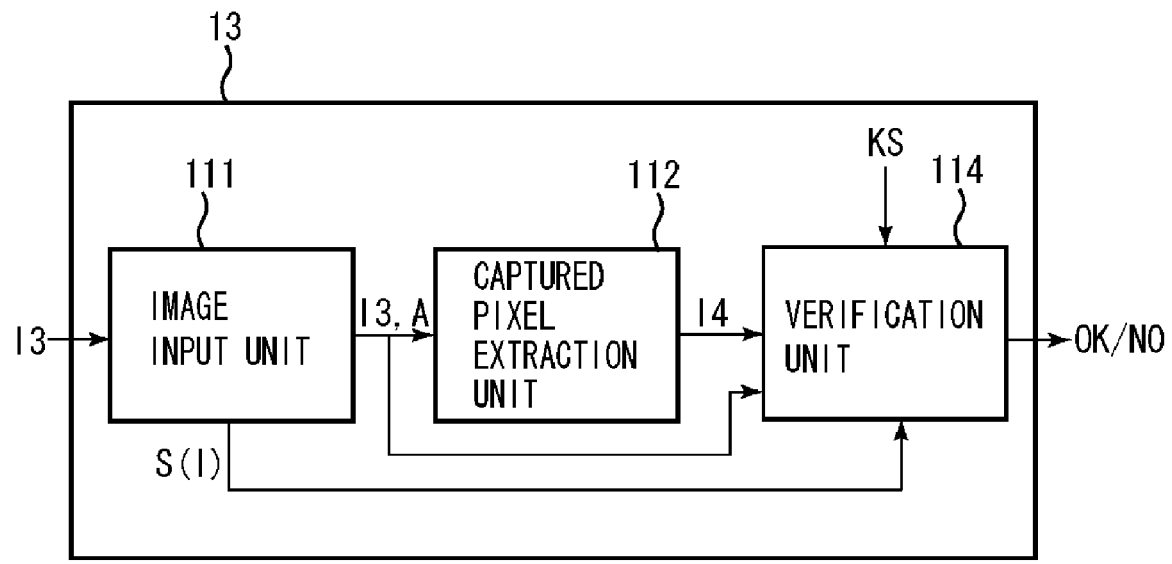

FIG. 19B illustrates an exemplary configuration of the image verification apparatus 13 if the verification data S(I) has been generated for the image data I.

In the example illustrated in FIG. 19B, the image data I4, which has been extracted by the captured pixel extraction unit 112, can be input to the verification unit 114. The verification unit 114 can execute the verification using the image data I4 and the verification data S(I).

A second exemplary embodiment of the present invention will now be described below. In the first exemplary embodiment, within the image input apparatus 11, the verification data generation unit 53 generates the verification data S(R) for the order information R, which is calculated by the order information calculation unit 52. Furthermore, the generated verification data S(R) is added to the image data I and is output together therewith.

In this case, within the image verification apparatus 13, the first verification unit 131 executes the verification processing using the verification data S(R).

However, the present invention is not limited to this. That is, it is also useful if, within the image input apparatus 11, the order information R itself, which has been calculated by the order information calculation unit 52, is added to the image data I and output together with the image data I. In this case, the image verification apparatus 13 can execute the verification processing using the order information R.

In this regard, in the present exemplary embodiment, the order information R is used instead of the verification data S(R).

Now, a function of the image input apparatus 11 according to the present exemplary embodiment will be described in detail below with reference to FIGS. 3A and 3B.

Figure 3A:
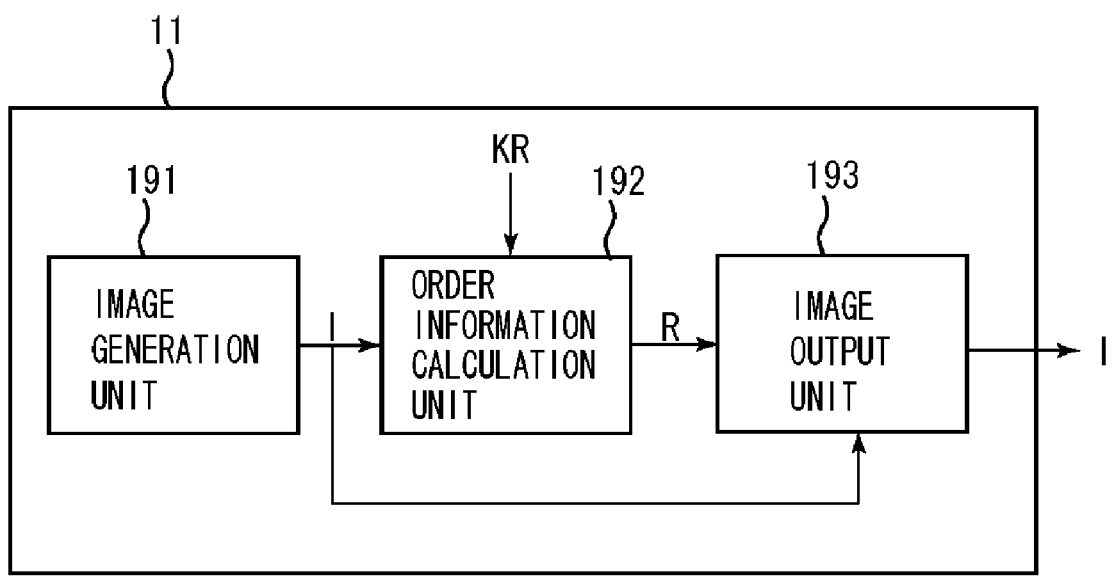
FIGS. 3A and 3B are block diagrams illustrating an exemplary configuration of an image input apparatus according to a second exemplary embodiment of the present invention.

Referring to FIG. 3A, the image input apparatus 11 according to the present exemplary embodiment includes an image generation unit 191, an order information calculation unit 192, and an image output unit 193.

Functions of the image generation unit 191, the order information calculation unit 192, and the image output unit 193 according to the present exemplary embodiment are similar to the above-described functions of the image generation unit 51 (FIG. 2B), the order information calculation unit 52 (FIG. 2B), and the image output unit 54 (FIG. 2B), respectively. Accordingly, the description thereof will not be repeated here.

More specifically, the present exemplary embodiment, as illustrated in FIG. 3A, executes processing different from that in the first exemplary embodiment (FIG. 2B) as follows. That is, in the present exemplary embodiment (FIG. 3A), the order information R generated by the order information calculation unit 192 is output to the image output unit 193. Furthermore, the order information R is added to the image data and is output together with the image data.

Now, a function of the image verification apparatus 13 according to the present exemplary embodiment will be described in detail below with reference to FIG. 11B.

Figure 11B:
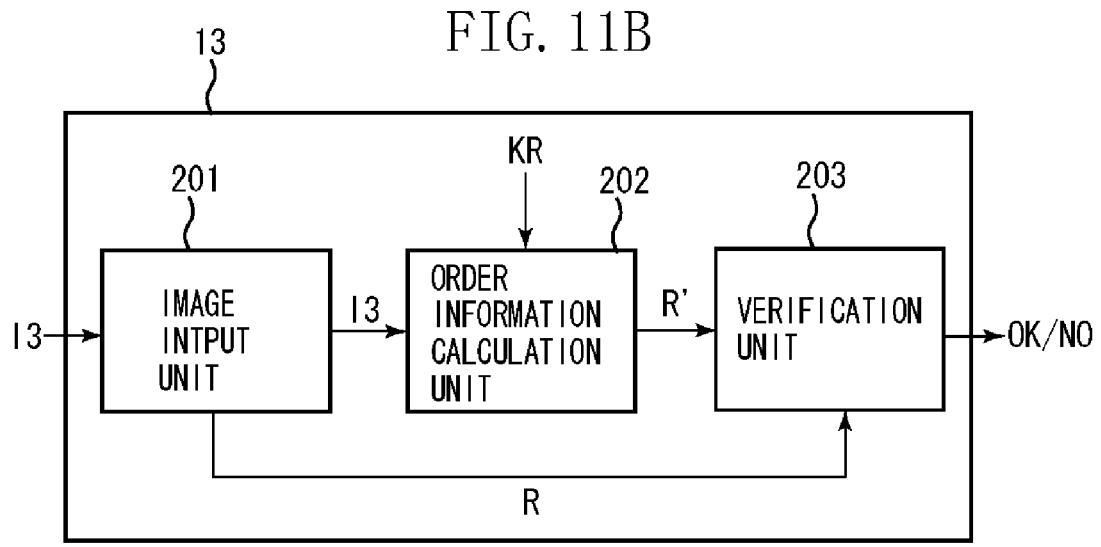
Figure 11C:
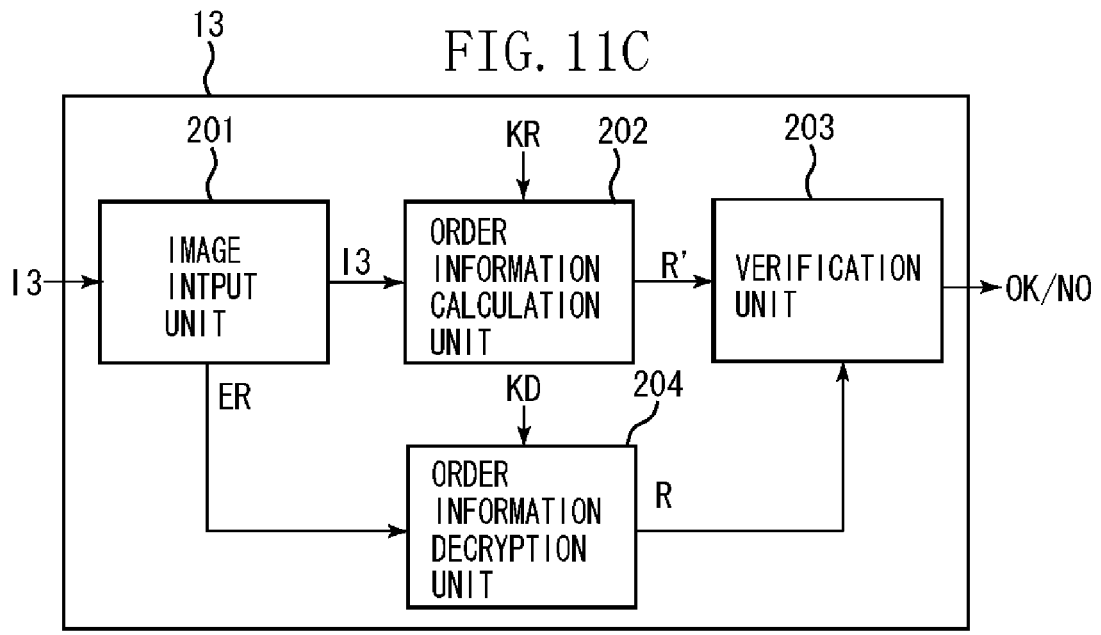

Referring to FIG. 11B, the image verification apparatus 13 according to the present exemplary embodiment includes an image input unit 201, an order information calculation unit 202, and a verification unit 203.

Functions of the image input unit 201 and the order information calculation unit 202 are similar to the functions of the image input unit 111 (FIG. 11A) and the captured pixel extraction unit 112 (FIG. 11A), respectively. Accordingly, the description thereof will not be repeated here. Hereinbelow, the function of the verification unit 203, which is different from that of the first exemplary embodiment, will be described in detail.

Figure 13B:
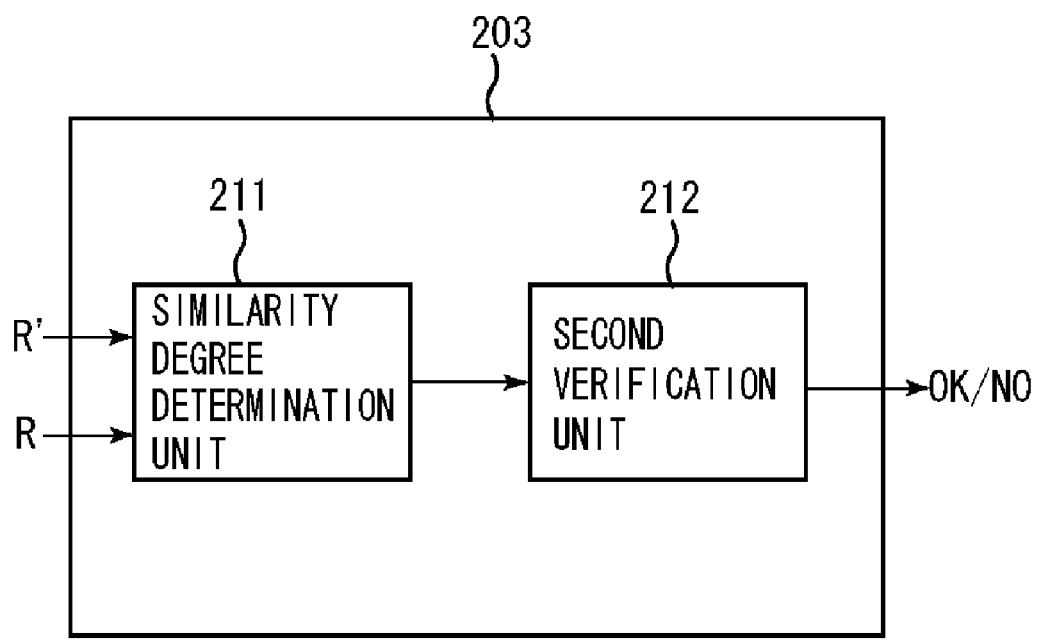

A function of the verification unit 203 according to the present exemplary embodiment will be described in detail below with reference to FIG. 13B. Referring to FIG. 13B, the verification unit 203 according to the present exemplary embodiment includes a similarity degree determination unit 211 and a second verification unit 212.

The second verification unit 212 according to the present exemplary embodiment executes processing similar to that executed by the second verification unit 132 (FIG. 13A). Accordingly, the description thereof will not be repeated here. Hereinbelow, the function of the similarity degree determination unit 211, which is different from the function of the first exemplary embodiment, will be described in detail.

When the order information R', which has been calculated by the order information calculation unit 202 (a unit upstream of the similarity degree determination unit 211), and the order information R that has been added to the image data I3 are input to the similarity degree determination unit 211, the similarity degree determination unit 211 calculates the degree of similarity between the input order information R' and order information R.

The second verification unit 212 verifies (determines) whether the image data I3 has been altered according to the calculated similarity degree. Furthermore, the second verification unit 212 outputs the verification result (OK/NO).

In the present exemplary embodiment, considering that the order information R and the order information R' have been generated using the above-described expression (1), a Hamming distance between the order information R and the order information R' is used as the similarity degree.

If it is determined that the calculated Hamming distance is equal to or smaller than a predetermined threshold value, then the similarity degree determination unit 211 determines that the order information R and the order information R' are similar to each other. In this case, the second verification unit 212 determines that the verification has been successfully completed ("OK"). On the other hand, if it is determined that the calculated Hamming distance is greater than the predetermined threshold value, then the similarity degree determination unit 211 determines that the order information R and the order information R' are not similar to each other. In this case, the second verification unit 212 determines that the verification has failed ("NO").

Note here that the "Hamming distance" refers to the number of different bits existing in two different bit strings at mutually corresponding locations. Accordingly, as the similarity degree becomes higher, the Hamming distance may become smaller. More specifically, if the Hamming distance is equal to or smaller than the predetermined threshold value, then the similarity degree is equal to or greater than the predetermined threshold value.

With respect to the threshold value used in the processing by the similarity degree determination unit 211, it is useful if a predetermined value is previously set and stored on the ROM 44, the RAM 45, or the HD 46 of the image verification apparatus (host computer) 41. In this case, the previously set value can be used as the threshold value.

Alternatively, it is also useful if the user of the image verification apparatus operates the pointing device 412 or the keyboard 413 to input a desired value. In this case, the value input by the user can be applied.

In the present exemplary embodiment, the Hamming distance is applied in determining the similarity degree. However, the present invention is not limited to this. That is, it is also useful if various other methods, such as a method that uses a cross-correlation function of the order information R and the order information R' or a method using Dynamic Programming (DP) matching, are used.

Figure 17:
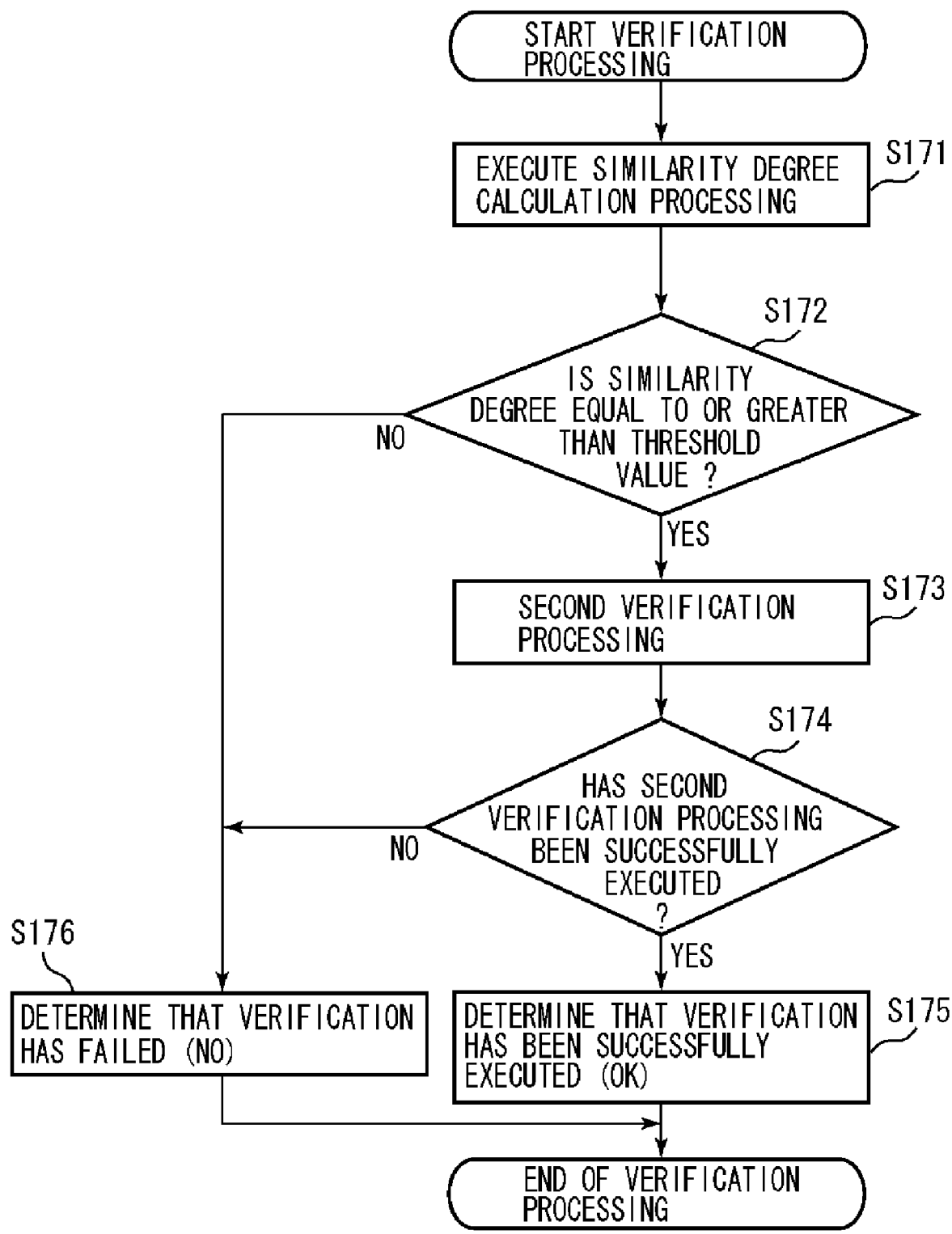
FIG. 17 is a flow chart illustrating an exemplary flow of verification processing according to the first exemplary embodiment of the present invention.

Now, an exemplary flow of processing executed by the verification unit 203 according to the present exemplary embodiment will be described in detail below with reference to FIG. 17. FIG. 17 is a flow chart illustrating an exemplary flow of processing executed by the verification unit 203 according to the present exemplary embodiment.

Referring to FIG. 17, in step S171, the similarity degree determination unit 211 calculates the degree of similarity between the input order information R and order information R'. In step S172, the similarity degree determination unit 211 determines whether the calculated similarity degree is equal to or greater than a threshold value.

If it is determined that the calculated similarity degree is equal to or greater than the threshold value (YES in step S172), then the processing advances to step S173. On the other hand, if it is determined that the calculated similarity degree is smaller than the threshold value (NO in step S172), then the processing advances to step S176.

In step S173, the second verification unit 212 executes the second verification processing on the interpolation target pixel. In step S174, the second verification unit 212 determines whether the second verification processing has been successfully completed.

If it is determined that the second verification processing has been successfully completed (YES in step S174), then the processing advances to step S175. On the other hand, if it is determined that the second verification processing has failed (NO in step S174), then the processing advances to step S176.

In step S175, the second verification unit 212 determines that the verification has been successfully completed and outputs a result indicating so ("OK"). On the other hand, in step S176, the second verification unit 212 determines that the verification has failed and outputs a result indicating so ("NO"). Then, the processing ends.

Now, the security implemented by the present exemplary embodiment will be described in detail below. In the present exemplary embodiment, whether the image data has been altered is determined according to the similarity degree of the order information R. Accordingly, if a person attacking the system, who has altered the image data I, newly generates order information R based on the altered image data, the image verification apparatus 13 may determines that the image data has not been altered although the image data has been surely altered.

Therefore, in the present exemplary embodiment, it is necessary that only the image input apparatus 11 can generate order information R. In this regard, in the present exemplary embodiment, a random number initial value KR is previously and securely shared by and stored on the image input apparatus 11 and the image verification apparatus 13.

With this configuration, the present exemplary embodiment can prevent the attacker from selecting a correct pixel pair. That is, because the attacker cannot generate correct order information R, the attacker cannot generate correct order information based on the altered image.

In the present exemplary embodiment, the order information R itself is added to the image data I and output. However, the present invention is not limited to this. It is also useful if the order information R is encrypted and the encrypted order information R is output.

Figure 3B:
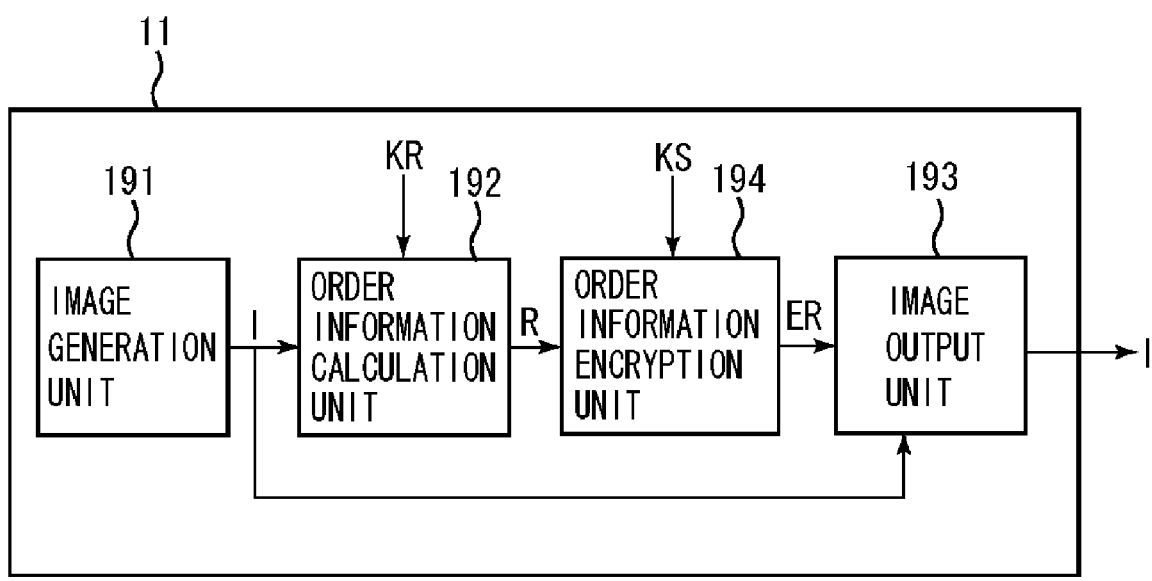

In this case, as illustrated in FIG. 3B, the following configuration can be applied. An order information encryption unit 194 is additionally provided. Order information R, which has been output from the order information calculation unit 192, is encrypted by the order information encryption unit 194 using a key KE. In this case, the image output unit 193 outputs encrypted order information ER.

Further alternatively, as illustrated in FIG. 1C, it is also useful if an order information decryption unit 204 is additionally provided. In this case, the image input unit 201 extracts the encrypted order information ER from the image data I3.

Furthermore, in this case, the order information decryption unit 204 decrypts the extracted encrypted order information ER using the key KD. Then, the decrypted order information R is input to the verification unit 203.

The encryption processing and the decryption processing executed by the order information encryption unit 194 and the order information decryption unit 204 are not limited to a particular method in the present invention. That is, various encryption algorithm can be applied.

In this regard, various other methods, such as Advanced Encryption Standard (AES) or Data Encryption Standard (DES), which use a common-key cryptographic system, or RSA, which uses a public-key cryptographic system, can be applied. Particularly when using the common-key cryptographic system, the keys KE and KD are the same. In this case, the image input apparatus 11 and the image verification apparatus 13 previously and confidentially share the keys KE and KD.

On the other hand, when the public-key cryptographic system is employed, the key KE is a public key and the key KD is a private key corresponding to the public key KE. In this case, the image input apparatus 11 and the image verification apparatus 13 previously store the corresponding keys KE and KD.

With the above-described configuration, even if the attacker has altered the image data I, which has been output from the image input apparatus 11, and attempts to generate encryption order information based on the altered image, the present exemplary embodiment can prevent the attacker from generating correct encryption order information because the KE is not available to the attacker.

In the first exemplary embodiment, the verification data generation unit 53 generates the verification data S(R) for the order information R, which has been calculated by the order information calculation unit 52. Furthermore, the first verification unit 131 determines whether the image data has been altered by using the generated verification data S(R). Accordingly, if any unmatching bit in the order information R is extracted, the alteration of the image data can be identified.

On the other hand, in the present exemplary embodiment, the order information R itself is used instead of the verification data S(R). In addition, in the present exemplary embodiment, the verification processing is executed using the similarity degree instead of a result of the bit-by-bit comparison between the order information R and the order information R'.

Accordingly, by appropriately setting the threshold value used in determining the similarity degree, if the order information R and the order information R' are different from each other by the number of bits equal to or smaller than a predetermined number of bits, then the present exemplary embodiment can determine that the verification has been successfully completed (the image has not been altered). If the order information R and the order information R' are different from each other by the number of bits equal to or greater than the predetermined number of bits, then the present exemplary embodiment can determine that the verification has failed (the image has been altered).

In the present exemplary embodiment, the verification processing is executed within the image verification apparatus 13 using all the order information R for the pixel pair IP selected by the pixel pair selection unit 62. However, the present invention is not limited to this.

That is, the verification processing can be executed within the image verification apparatus 13 using the pixel pair IP having an unmatching pixel value among the pixel pairs IP selected by the pixel pair selection unit 62 except the pixel pair IP whose all pixel values are determined as matching pixel values.

Accordingly, the present exemplary embodiment can calculate the degree of similarity between the order information R and the order information R' for the pixel pair IP having an unmatching pixel value only. Thus, the present exemplary embodiment can execute the verification processing with a high accuracy.

In the above-described first and the second exemplary embodiments, the pixel pair selection unit 62 selects a pixel pair IP for the pixel constituting the image data I, which is generated by the image generation unit 51. Furthermore, the pixel value comparison unit 63 calculates the order information R of the selected pixel pair IP. However, the present invention is not limited to the method of selecting a pixel pair IP for the pixel. That is, it is also useful if order information is calculated for a characteristic amount of the pixel value included in an area having a rectangular shape or an area having an arbitrary shape including a plurality of pixel values. In this case, with respect to the characteristic amount, various types of characteristic amounts, such as the average value of pixel values or the distribution of the pixel values, can be applied.

Hereinbelow, an exemplary embodiment will be described in detail in which the pixel value of at least two pixels is used instead of using the pixel value of one pixel.

In the above-described first and the second exemplary embodiments, an arbitrary pixel pair is selected using a random number. In the present exemplary embodiment, only a rectangular block pair satisfying a predetermined condition is selected.

The order information calculation unit 52 according to the present exemplary embodiment will be described in detail below with reference to FIG. 6B.

Figure 6B:
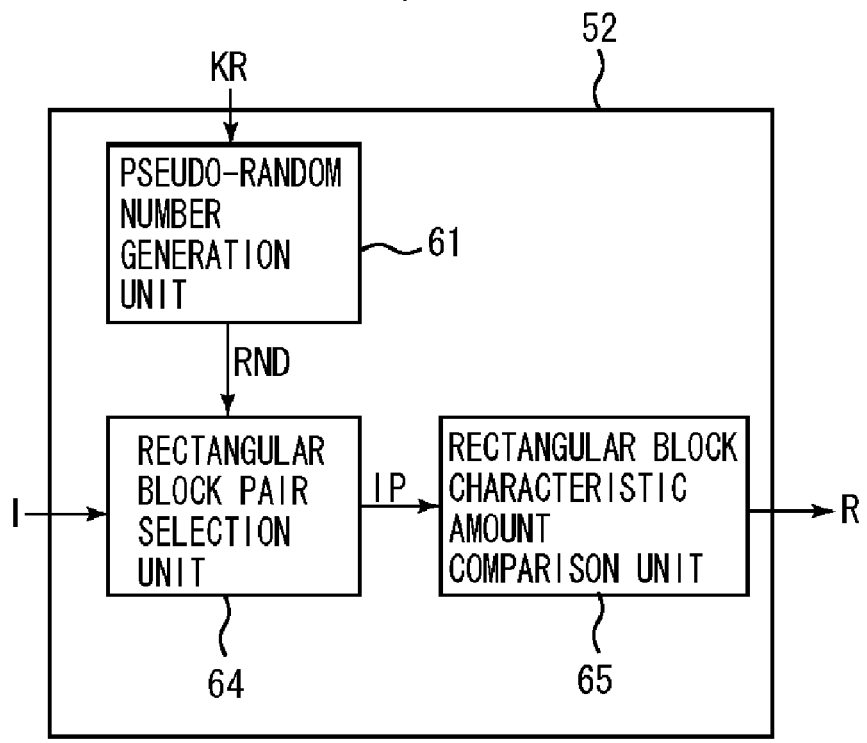

Referring to FIG. 6B, the order information calculation unit 52 according to the present exemplary embodiment includes a pseudo-random number generation unit 61, a rectangular block pair selection unit 64, and a rectangular block characteristic amount comparison unit 65. The pseudo-random number generation unit 61 executes processing similar to the processing executed by the pseudo-random number generation unit 61 illustrated in FIG. 6A. Accordingly, the description thereof will not be repeated here.

The rectangular block pair selection unit 64 divides the input image data I into rectangular blocks or areas having an arbitrary shape. Furthermore, the rectangular block pair selection unit 64 selects a rectangular block pair from the rectangular blocks generated by the division processing using the pseudo-random number RND.

The rectangular block characteristic amount comparison unit 65 calculates the characteristic amount of the selected rectangular block pair. Furthermore, the rectangular block characteristic amount comparison unit 65 calculates the order information (the magnitude relationship) using the calculated characteristic amount as a comparison target.

In the present exemplary embodiment, the average value of the pixel values is used as the characteristic amount of the rectangular block pair. However, the present invention is not limited to this. That is, various other characteristic amounts, such as the distribution of pixel values or standard deviation thereof, can be applied.

Now, an exemplary flow of rectangular block pair selection processing executed within the rectangular block pair selection unit 64 according to the present exemplary embodiment will be described in detail below.

FIG. 12A is a flow chart illustrating an example of the rectangular block pair selection processing executed within the rectangular block pair selection unit 64 according to the present exemplary embodiment.

Referring to FIG. 12A, in step S251, the rectangular block pair selection unit 64 selects a criterion rectangular block using the pseudo-random number RND generated by the pseudo-random number generation unit 61. In step S252, the rectangular block pair selection unit 64 selects a candidate of a reference rectangular block using the pseudo-random number RND.

In the present exemplary embodiment, the criterion rectangular block and the reference rectangular block are selected by serially generating a pseudo-random number RND (RND is an integer greater than 0) smaller than the width and the height of the image data I and identifying a coordinate value of the upper left portion of the rectangular block using the generated pseudo-random number RND.

Alternatively, it is also useful if the following configuration is applied. That is, a rectangular block number is previously provided to each rectangular block. In this case, the criterion rectangular block and the reference rectangular block are selected by identifying the rectangular block number using the generated pseudo-random number.

Regardless of which of the above-described configuration is to be applied, in the present exemplary embodiment, the criterion rectangular block and the reference rectangular block are selected at random using the pseudo-random number RND.

In step S253, the rectangular block pair selection unit 64 calculates the average value of the pixel values of the selected reference rectangular block candidate. In step S254, the rectangular block pair selection unit 64 determines whether the calculated average value is included in a predetermined range. If it is determined that the calculated average value is included in the predetermined range (YES in step S254), then the processing advances to step S252. On the other hand, if it is determined that the calculated average value is not included in the predetermined range (NO in step S254), then the processing advances to step S255.

Figure 5A:
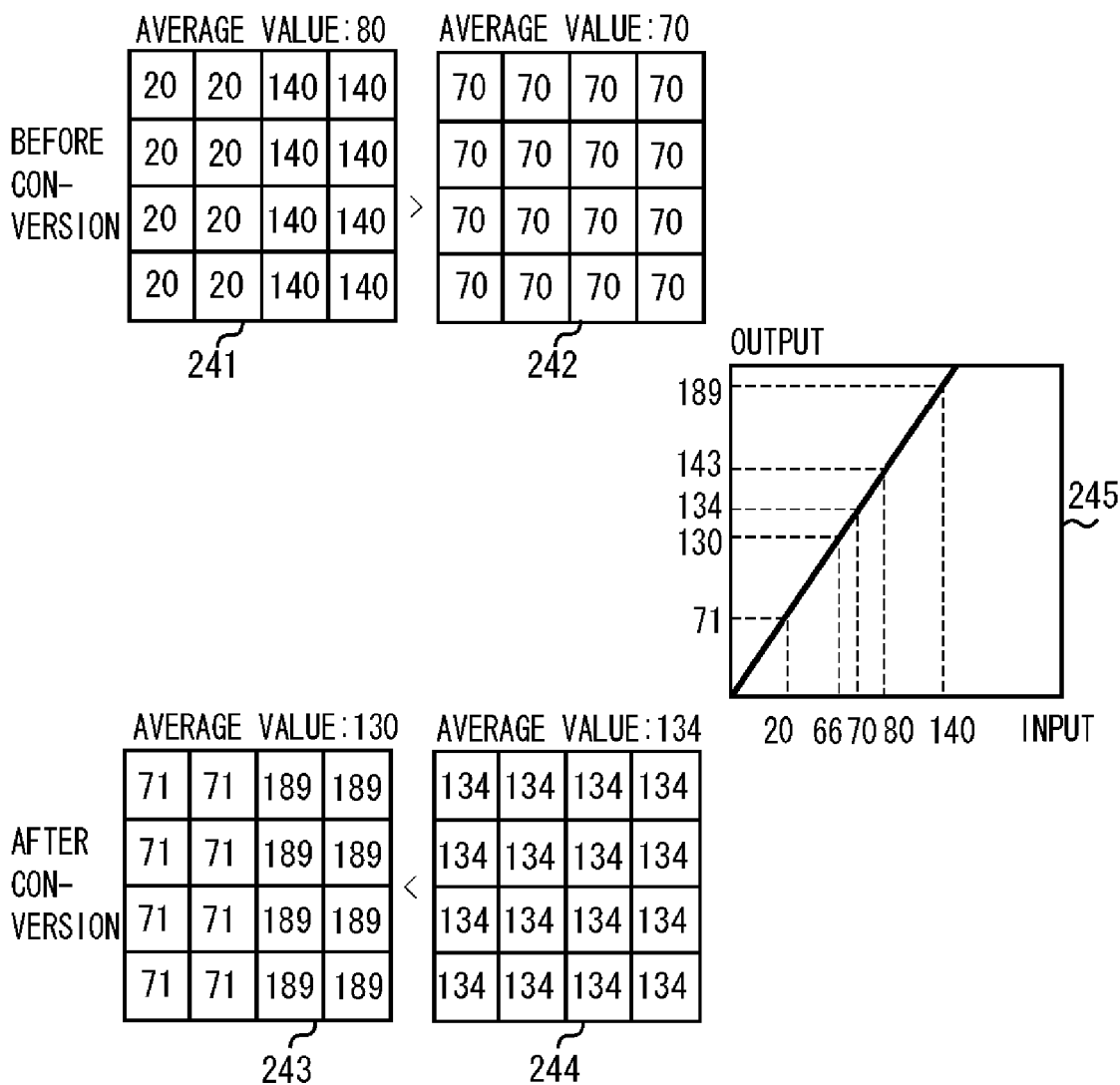
FIGS. 5A and 5B illustrate a problem to be solved according to a third exemplary embodiment of the present invention.
Figure 5B:
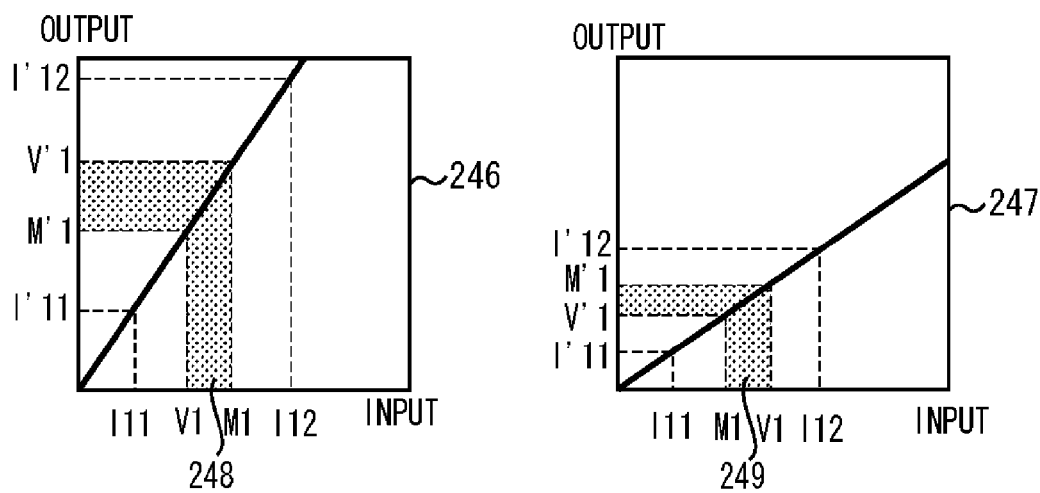

For the predetermined range, a range is used that is greater than a value V, which is acquired by reversely converting the average value of an after-conversion criterion rectangular block, and smaller than an average value M, which is an average of a before-conversion criterion rectangular block (a portion 248, which is indicated in a meshed state in FIG. 5B).

Alternatively, for the predetermined range, a range can be used that is greater than the average value M of the before-conversion criterion rectangular block and smaller than the value V, which is acquired by reversely converting the average value of the after-conversion criterion rectangular block (a portion 249, which is indicated in a meshed state in FIG. 5B). The configuration illustrated in FIGS. 5A and 5B will be described in detail below.

In step S255, the rectangular block pair selection unit 64 determines a block whose pixel values have an average value exceeding the predetermined range as the reference rectangular block. The above-described processing is repeated for the number of times equivalent to the number of the rectangular block pairs.

As described above, the rectangular block pair selection unit 64 does not merely select the reference rectangular block selected in step S252. Instead of this, the rectangular block pair selection unit 64 calculates the average value of the reference rectangular block in step S253. Furthermore, in step S254, the rectangular block pair selection unit 64 determines whether to newly select a reference rectangular block according to the calculated average value.

The above-described processing is not necessary when a pixel is used but is necessary when a rectangular block is used. Hereinbelow, the reason why the processing illustrated in FIG. 12A is necessary in the case of using a rectangular block will be described in detail.

A problem that may arise when a rectangular block includes a plurality of pixels will be described in detail below with reference to FIGS. 5A and 5B.

FIG. 5A specifically illustrates the problem that may arise when a rectangular block including a plurality of pixels is applied. Referring to FIG. 5A, rectangular blocks 241, 242, 243, and 244 each include pixels as their factors. More specifically, each of the rectangular blocks 241, 242, 243, and 244 includes sixteen (4×4) pixels as their factors. A value indicated in each factor indicates a pixel value of each pixel.

Furthermore, the rectangular blocks 241 and 242 are before-conversion rectangular blocks. The rectangular blocks 243 and 244 are after-conversion rectangular blocks. Each of the rectangular blocks 241 and 243, which are used as a criterion of comparison, is referred to as a "criterion rectangular block". On the other hand, each of the rectangular blocks 242 and 244, which is a comparison target rectangular block, is referred to as a "reference rectangular block".

In the example illustrated in FIG. 5A, each pixel value within the rectangular block 241 is either "20" or "140". Accordingly, the average value of the pixel values of the rectangular block 241 is "80". On the other hand, each pixel value of the before-conversion rectangular block 242 is "70". Accordingly, the average value of the pixel values of the rectangular block 242 is "70".

Here, before the conversion, the average value "80" of the criterion rectangular block 241 is greater than the average value "70" of the reference rectangular block 242. In the present exemplary embodiment, the pixel values are converted by using a correspondence relationship indicated by a correspondence chart 245. In the correspondence chart 245, the input is taken on the x-axis and the output is taken on the y-axis. A thick line indicates the conversion timing. In the correspondence chart 245, it can be known that an input value "20" is converted into an output value "71".

If the rectangular blocks 241 and 242 are converted according to the correspondence relationship indicated in the correspondence chart 245, the pixel values "20" and "140" within the rectangular block 241 are converted into values "71" and "189", respectively. On the other hand, the pixel value "70" within the rectangular block 242 is converted into a value "134".

Each of the rectangular blocks 243 and 244 is an after-conversion rectangular block. With respect to the average value of the pixel values of each after-conversion rectangular block, the average value of the rectangular block 243 is "130" while that of the rectangular block 244 is "134".

Thus, after the conversion, the average value of the criterion rectangular block 243 ("130") has become smaller than that of the reference rectangular block 244 ("134"). Thus, the magnitude relationship of the average values of the rectangular blocks has reversed across the timing of conversion.

The reversal may occur if the average value of the before-conversion reference rectangular block is smaller than the average value ("80") of the before-conversion criterion rectangular block and greater than the value ("66"), which is calculated by reversely converting the average value ("130") of the after-conversion criterion rectangular block.

The above-described reversal will be described in general below with reference to FIG. 5B. Referring to FIG. 5B, a chart 246 corresponds to conversion for increasing the pixel value (conversion for correcting the color components to be lighter). A chart 247 corresponds to conversion for decreasing the pixel value (conversion for correcting the color components to be darker).

"I11" denotes the minimum value of the pixel value included in the before-conversion criterion rectangular block. "I12" denotes the maximum value of the pixel value included in the before-conversion criterion rectangular block 242. "M1" denotes the average value of the before-conversion criterion rectangular block. "V1" denotes the value calculated by reversely converting the average value of the after-conversion criterion rectangular block.

Furthermore, "I'11" denotes the minimum value of the pixel value included in the after-conversion criterion rectangular block. "I'12" denotes the maximum value of the pixel value included in the after-conversion criterion rectangular block 242. "M'1" denotes the average value of the after-conversion criterion rectangular block. "V'1" denotes the value calculated by reversely converting the average value of the before-conversion reference rectangular block.

When the conversion indicated with the chart 246 is executed, if the average value of the criterion rectangular block and the average value of the reference target (comparison target) rectangular block are greater than the value V1 and smaller than the value M1, the reversal of the average value of the criterion rectangular block and the average value of the reference rectangular block occurs across the timing of the conversion.

On the other hand, when the conversion indicated with the chart 247 is executed, if the average value of the reference rectangular block is greater than the value M1 and smaller than the value V1, the reversal of the average value of the criterion rectangular block and the average value of the reference rectangular block occurs across the timing of the conversion.

Accordingly, the present exemplary embodiment does not select a block pair in which the above-described reversal may occur. With this configuration, the present exemplary embodiment can secure the authenticity of the image data that has been subjected to image reproduction processing.

The above-described reversal may occur if the distribution of a plurality of pixel values included in the rectangular block is high. Accordingly, it is not necessary to execute the processing in steps S252, S253, and S254 on all the rectangular blocks. That is, it is also useful if the processing in steps S252, S253, and S254 is executed when the distribution of a plurality of pixel values included in the rectangular block is high.

A modification of the present exemplary embodiment applied in this case is illustrated in FIG. 12B. FIG. 12B is a flow chart illustrating an exemplary flow of rectangular block pair selection processing according to the modification of the present exemplary embodiment.

In the example illustrated in FIG. 12B, the processing that is similar to that of FIG. 12A is provided with the same step number. The processing illustrated in FIG. 12B is the same as that illustrated in FIG. 12A except for steps S256 and S257.

Referring to FIG. 12B, in step S256, the rectangular block pair selection unit 64 calculates the distribution of the pixel values of the criterion rectangular block selected in step S251. In step S257, the rectangular block pair selection unit 64 determines whether the distribution is equal to or greater than a threshold value. If it is determined that the distribution is equal to or greater than the threshold value (YES in step S257), then the processing advances to step S252. On the other hand, if it is determined that the distribution is smaller than the threshold value (NO in step S257), then the processing advances to step S255.

As described above with reference to FIG. 12B, the rectangular block pair selection unit 64 executes the processing in steps S252, S253, and S254 only on the rectangular block whose distribution of pixel values is high. Accordingly, the rectangular block pair selection unit 64 can more efficiently select the rectangular block pair than in the case of executing the processing illustrated in FIG. 12A.

The information about the rectangular block pair (coordinates, for example) selected during the processing illustrated in FIGS. 12A and 12B can be output by the image output unit 54 together with the image data I.

In the processing illustrated in FIGS. 12A and 12B, the criterion rectangular block is determined in step S251. Furthermore, in step S254, it is determined whether the average value of the reference rectangular block candidate is included in a predetermined range. However, the present invention is not limited to this. That is, it is also useful if the reference rectangular block is determined in step S251 and it is determined whether the average value of the criterion rectangular block is included in a predetermined range in step S254.

Regardless of which of the above-described configurations is applied, either one of the rectangular blocks included in the rectangular block pair is determined in step S251 and the average value of the other is subjected to the determination in step S254.

Note here that in step S254, if it has been previously determined which of the conversions 248 and 249 is to be executed, the value V, which is acquired by reversely converting the average value of the after-conversion criterion rectangular block, can be calculated. On the other hand, in step S254, if the type of the conversion to be executed has not been previously determined, the value V, which is acquired by reversely converting the average value of the after-conversion criterion rectangular block, cannot be calculated.

In the present exemplary embodiment, the average value that is at least included in the above-described range can be used. Accordingly, if the type of the conversion to be executed has not been previously designated, the pixel value at least included in the above-described range can be used.

In this regard, as illustrated in FIG. 5B, the minimum value of the pixel value included in the criterion rectangular block is always smaller than the value V, which is calculated by reversely converting, at least, the average value of the after-conversion criterion rectangular block, and the average value M of the before-conversion criterion rectangular block.

Similarly, the maximum value of the pixel value in the criterion rectangular block is always greater than the value V, which is calculated by reversely converting, at least, the average value of the after-conversion criterion rectangular block, and the average value M of the before-conversion criterion rectangular block.

Accordingly, in this case, for the range applied in step S254, the range can be applied in which the average value of the reference rectangular block candidate is greater than the minimum value of the pixel value of the criterion rectangular block and smaller than the maximum value of the pixel value of the criterion rectangular block.

The present invention can be implemented by the above-described exemplary embodiments. As described above, the image input apparatus and the image verification processing are general-purpose information processing apparatus such as a general-purpose PC. A computer program operating on such an information processing apparatus can implement the above-described image input apparatus and the image verification apparatus. Accordingly, the computer program is included in the scope of the present invention.

Furthermore, generally, the computer program is stored on a computer-readable storage medium such as a CD-ROM. The computer program can be executed by setting the storage medium storing the computer program on a drive of the computer and copying and installing the computer program on the system. Accordingly, the computer-readable storage medium can implement an aspect of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Applications No. 2008-169334 filed Jun. 27, 2008 and No. 2009-122218 filed May 20, 2009, which are hereby incorporated by reference herein in their entirety.

What is claimed is:

1. An information processing apparatus comprising:
an input unit configured to input image data including a first pixel group, a second pixel group generated by interpolating the first pixel group and verification data of the first pixel group;
a first verification unit configured to verify whether the first pixel group has been altered using the first pixel group and the verification data;
a second verification unit configured to verify whether the second pixel group has been altered by determining whether the second pixel group and the first pixel group are in a predetermined relationship; and
a determination unit configured to determine whether the image data has been altered based on results of the verification by the first verification unit and the second verification unit,
wherein the first pixel group is a group of pixels captured by an image sensor, and
wherein the information processing apparatus further comprises an identification unit configured to identify a location of the first pixel group using pixel arrangement information used during image capturing, and
wherein the first verification unit is configured to determine whether the pixel group identified by the identification unit has been altered.

2. The information processing apparatus according to claim 1, wherein the second verification unit is configured, if it is determined by the first verification unit that the first pixel group has not been altered, to determine whether the second pixel group has been altered.

3. An information processing method comprising:
inputting image data including a first pixel group, a second pixel group generated by interpolating the first pixel group and verification data of the first pixel group;
verifying whether the first pixel group has been altered using the first pixel group and the verification data;
verifying whether the second pixel group has been altered by determining whether the second pixel group and the first pixel group are in a predetermined relationship; and
determining whether the image data has been altered based on results of the verification of the first pixel group and the second pixel group,
wherein the first pixel group is a group of pixels captured by an image sensor, and
identifying a location of the first pixel group using pixel arrangement information used during image capturing, and
determining whether the pixel group identified has been altered.

4. The information processing method according to claim 3, wherein the step of verifying whether the first pixel group has been altered comprises executing similarity degree calculation between a pixel value and a corrected pixel value.

5. The information processing method according to claim 4, wherein the corrected pixel value is contrast- or color-corrected.

6. The information processing method according to claim 3, wherein the verification data is received from an input means into which the first pixel group is input and comprises data chosen from a group including at least message authentication code and a digital signature.

7. A non-transitory computer-readable storage medium having stored thereon computer program code which, when executed by a computer, causes the computer to carry out the information processing method according to claim 3.

* * * * *